(12) United States Patent
Saha et al.

(10) Patent No.: US 11,700,255 B2
(45) Date of Patent: *Jul. 11, 2023

(54) FEEDBACK FRAMEWORK

(71) Applicant: ServiceNow, Inc., Santa Clara, CA (US)

(72) Inventors: Prabodh Saha, Hyderabad (IN); Manojkumar Haridas Shende, Redmond, WA (US); Venu Gopal Rao Vajjala, Hyderabad (IN); Revanth Chowdary, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 78 days.

This patent is subject to a terminal disclaimer.

(21) Appl. No.: 17/373,095

(22) Filed: Jul. 12, 2021

(65) Prior Publication Data

US 2021/0344679 A1    Nov. 4, 2021

Related U.S. Application Data

(63) Continuation of application No. 16/169,070, filed on Oct. 24, 2018, now Pat. No. 11,063,946.

(51) Int. Cl.
| | |
|---|---|
| *H04L 9/40* | (2022.01) |
| *G06F 11/34* | (2006.01) |
| *G06F 11/36* | (2006.01) |
| *G06F 11/07* | (2006.01) |
| *G06F 11/20* | (2006.01) |

(52) U.S. Cl.
CPC .............. *H04L 63/10* (2013.01); *G06F 11/34* (2013.01); *G06F 11/362* (2013.01)

(58) Field of Classification Search
CPC ........ H04L 63/10; G06F 11/34; G06F 11/362; G06F 11/0709; G06F 11/0769; G06F 11/2094

See application file for complete search history.

(56) References Cited

U.S. PATENT DOCUMENTS

| | | |
|---|---|---|
| 6,321,229 B1 | 11/2001 | Goldman |
| 6,609,122 B1 | 8/2003 | Ensor |
| 6,799,189 B2 | 9/2004 | Huxoll |

(Continued)

*Primary Examiner* — Darren B Schwartz
(74) *Attorney, Agent, or Firm* — Fletcher Yoder PC

(57) ABSTRACT

The present disclosure includes a feedback framework that receives feedback for a component of an information technology platform. The component includes the feedback framework, the information technology platform, a software application, a web browser, a client device, a client instance, or a virtual server. The feedback framework obtains context information associated with the feedback. The context information includes a system log, a screenshot, a web address of a web browser of the client device, version information, and/or the like. The feedback framework also determines an identity of the component by executing a handler. The feedback framework then determines a notification to send based on the identity of the component, and sends the notification with the feedback and the context information. In this manner, the feedback framework provides sufficient context information associated with the feedback to diagnose and address issues while delivering the feedback and context information quickly and efficiently.

20 Claims, 21 Drawing Sheets

(56) References Cited

U.S. PATENT DOCUMENTS

| | | |
|---|---|---|
| 6,816,898 B1 | 11/2004 | Scarpelli |
| 6,895,586 B1 | 5/2005 | Brasher |
| 7,020,706 B2 | 3/2006 | Cates |
| 7,027,411 B1 | 4/2006 | Pulsipher |
| 7,028,301 B2 | 4/2006 | Ding |
| 7,047,394 B1 * | 5/2006 | Van Dyke ............ G06F 9/30123 712/E9.035 |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,392,300 B2 | 6/2008 | Anantharangachar |
| 7,610,512 B2 | 10/2009 | Gerber |
| 7,617,073 B2 | 11/2009 | Trinon et al. |
| 7,685,167 B2 | 3/2010 | Mueller |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |
| 7,925,981 B2 | 4/2011 | Pourheidar |
| 7,930,396 B2 | 4/2011 | Trinon |
| 7,933,927 B2 | 4/2011 | Dee |
| 7,945,860 B2 | 5/2011 | Vambenepe |
| 7,966,398 B2 | 6/2011 | Wiles |
| 8,051,164 B2 | 11/2011 | Peuter |
| 8,082,222 B2 | 12/2011 | Rangarajan |
| 8,151,261 B2 | 4/2012 | Sirota |
| 8,224,683 B2 | 7/2012 | Manos |
| 8,266,096 B2 | 9/2012 | Navarrete |
| 8,380,645 B2 | 2/2013 | Kowalski |
| 8,457,928 B2 | 6/2013 | Dang |
| 8,478,569 B2 | 7/2013 | Scarpelli |
| 8,554,750 B2 | 10/2013 | Rangaranjan |
| 8,646,093 B2 | 2/2014 | Myers |
| 8,674,992 B2 | 3/2014 | Poston |
| 8,689,241 B2 | 4/2014 | Naik |
| 8,743,121 B2 | 6/2014 | De Peuter |
| 8,745,040 B2 | 6/2014 | Kowalski |
| 8,812,539 B2 | 8/2014 | Milousheff |
| 8,828,994 B2 | 8/2014 | Kowalski |
| 8,832,652 B2 | 9/2014 | Meuller |
| 8,887,133 B2 | 11/2014 | Behnia |
| 9,015,188 B2 | 4/2015 | Behne |
| 9,037,536 B2 | 5/2015 | Vos |
| 9,065,783 B2 | 6/2015 | Ding |
| 9,098,322 B2 | 8/2015 | Apte |
| 9,122,552 B2 | 9/2015 | Whitney |
| 9,239,857 B2 | 1/2016 | Trinon |
| 9,363,252 B2 | 6/2016 | Mueller |
| 9,417,986 B1 * | 8/2016 | Bates .................... G06F 11/079 |
| 9,535,737 B2 | 1/2017 | Joy |
| 9,557,969 B2 | 1/2017 | Sharma |
| 9,626,283 B1 | 4/2017 | Zlatnik |
| 9,645,833 B2 | 5/2017 | Mueller |
| 9,654,473 B2 | 5/2017 | Miller |
| 9,766,935 B2 | 9/2017 | Kelkar |
| 9,792,387 B2 | 10/2017 | George |
| 9,805,322 B2 | 10/2017 | Kelkar |
| 9,852,165 B2 | 12/2017 | Morozov |
| 10,002,203 B2 | 6/2018 | George |
| 10,019,716 B1 | 7/2018 | Ainslie |
| 10,489,232 B1 * | 11/2019 | BeSerra ............... G06F 11/0709 |
| 10,542,001 B1 * | 1/2020 | Leung ................. H04L 63/1441 |
| 2001/0014958 A1 * | 8/2001 | Yamauchi ............. G06F 11/366 714/E11.178 |
| 2003/0093579 A1 * | 5/2003 | Zimmer ................ G06F 9/4812 719/318 |
| 2005/0053091 A1 | 3/2005 | Lee |
| 2006/0095285 A1 | 5/2006 | Sol et al. |
| 2006/0230026 A1 | 10/2006 | Pereira |
| 2007/0226201 A1 | 9/2007 | Lerum |
| 2008/0155013 A1 | 6/2008 | Morris |
| 2009/0228789 A1 | 9/2009 | Brugler et al. |
| 2009/0307105 A1 | 12/2009 | Lemay et al. |
| 2010/0125854 A1 | 5/2010 | Marumanchi et al. |
| 2010/0131743 A1 | 5/2010 | Meijer et al. |
| 2010/0211924 A1 | 8/2010 | Begel et al. |
| 2010/0262814 A1 * | 10/2010 | Pardoe .................. G06F 9/4812 712/E9.06 |
| 2012/0311538 A1 | 12/2012 | Bhatia et al. |
| 2012/0317545 A1 | 12/2012 | Chandra et al. |
| 2013/0036407 A1 | 2/2013 | Zheng et al. |
| 2013/0074051 A1 | 3/2013 | Freeman |
| 2013/0218991 A1 | 8/2013 | McConnell |
| 2013/0219365 A1 | 8/2013 | Rago et al. |
| 2015/0019518 A1 | 1/2015 | Birmiwal |
| 2015/0156219 A1 * | 6/2015 | Narayanaswamy .... H04L 63/10 726/1 |
| 2016/0224337 A1 | 8/2016 | Xia et al. |
| 2016/0260157 A1 * | 9/2016 | Krook ................... H04W 4/60 |
| 2016/0259804 A1 | 12/2016 | Subramaniam et al. |
| 2016/0378637 A1 | 12/2016 | Gamble et al. |
| 2017/0060568 A1 | 3/2017 | Seibert, Jr. et al. |
| 2017/0161243 A1 | 6/2017 | Manoraj et al. |
| 2017/0220972 A1 | 8/2017 | Conway |
| 2017/0255972 A1 | 9/2017 | Martens, Jr. |
| 2017/0269976 A1 | 9/2017 | Venkataraman et al. |
| 2017/0357809 A1 | 12/2017 | Smith |

* cited by examiner

FEEDBACK FRAMEWORK

CROSS-REFERENCE TO RELATED APPLICATION

This application is a continuation of U.S. patent application Ser. No. 16/169,070, filed Oct. 24, 2018, and entitled, "FEEDBACK FRAMEWORK," which is herein incorporated by reference.

BACKGROUND

The present disclosure relates generally to providing feedback associated with a cloud computing service, and, more particularly, providing a feedback framework that obtains context information related to the component of the cloud computing service for which feedback is given.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations. These resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

When a client or user uses the cloud computing service, the client may desire to provide feedback related to a component of the cloud computing service. For example, the cloud computing service may provide an information technology platform that includes a virtual server which enables a client instance. The client instance may execute a software application that is accessible or operable by each client device. While operating the software application using a client device, the client may desire to provide feedback relating to the software application, the client device, the client instance, the virtual server, the information technology platform, and/or the cloud computing service. For example, the client may experience an application performance issue, a network issue, a database issue, or the like, and desire to report the issue.

However, the feedback given by the client may not provide enough context to adequately address the feedback. For example, the feedback may not properly identify what component of the cloud computing service the feedback relates to. Moreover, feedback may not be enabled globally. For example, the software application may enable the client to provide feedback (e.g., by selecting a feedback control) when the software application is being executed. However, if the client closes the software application, the client may no longer be able to provide feedback related to the software application. Additionally, the feedback provided by the client may be sent to a central location (e.g., a single email address), instead of to a more relevant department or person. In some cases, the client may desire to provide feedback relating to a third party software application running on the information technology platform. However, the feedback may be received via the information technology platform, and may only be routed to developers of the third party software application manually.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure includes an information technology platform having a feedback framework that obtains context information associated with a component of the information technology platform, such as a software application, a web browser executing or otherwise accessing the software application, a client device, a client instance, a virtual server, an information technology platform, and/or a cloud computing service being used by a client. In particular, a developer may provide a handler or function that enables identification of the component (e.g., using pattern recognition techniques), and the feedback framework may execute the handler to determine the identity of the component. The feedback framework may obtain web browser information, a system log, screenshots, user comments, user ratings, a Uniform Resource Locator (URL), processor or central processing unit (CPU) health information, network health information, and/or prompts or error messages.

Additionally, the feedback framework may enable the client to globally provide feedback. For example, the information technology platform may be implemented via a web browser, and the feedback framework may provide a feedback control that is integrated with the web browser. As such, the client may, at any point when using the information technology platform via the web browser, select the feedback control to provide feedback regarding the software application, the client device, the client instance, the virtual server, the information technology platform, and/or the cloud computing service.

Moreover, the feedback provided by the client may be directly sent by the feedback framework to a relevant department or person maintaining the software application, the web browser executing the software application, the client device, the client instance, the virtual server, the information technology platform, and/or the cloud computing service, rather than a central location where additional routing may be performed. For third party software application, the feedback framework may receive feedback related to the third party software application, and make accessible or send the feedback to developers of the third party software application.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
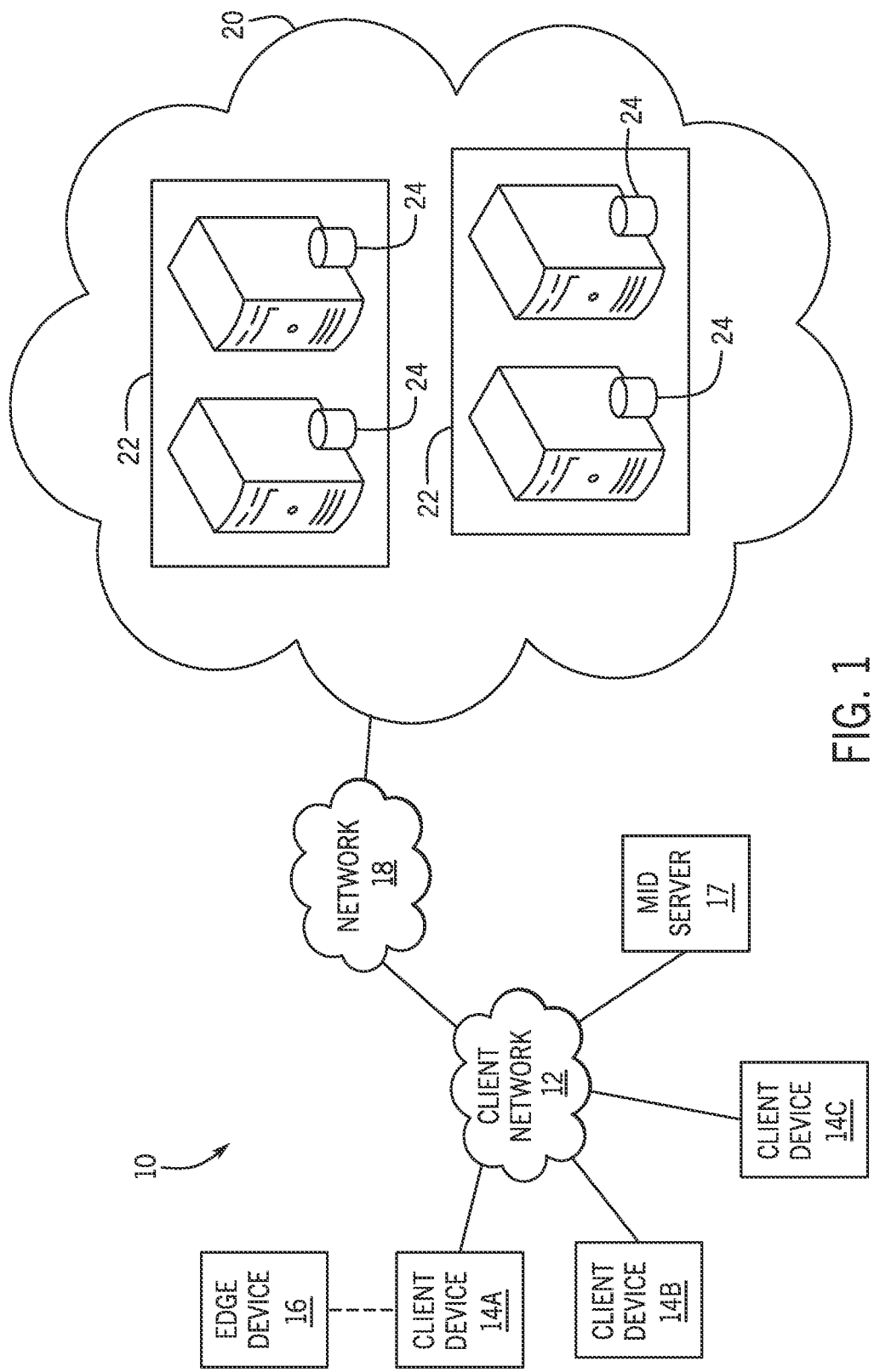
FIG. 1 is a block diagram of an embodiment of a cloud computing system in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device that includes, but is not limited to a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

The present disclosure relates to an information technology platform having a feedback framework that obtains context information associated with a software application, a web browser executing the software application, a client device, a client instance, a virtual server, an information technology platform, and/or a cloud computing service being used by a client. In this manner, developers seeking to understand an issue for which the client is providing feedback may adequately understand and debug the issue.

Additionally, the feedback framework may enable the client to globally provide feedback. For example, the information technology platform may be accessed via a web browser, and the feedback framework may provide a feedback control that is integrated with the web browser. As such, the client may, at any point when using the information technology platform via the web browser, select the feedback control to provide feedback regarding the software application, the client device, the client instance, the virtual server, the information technology platform, and/or the cloud computing service.

Moreover, the feedback provided by the client may be directly sent by the feedback framework to a relevant department or person maintaining the software application, the web browser executing the software application, the client device, the client instance, the virtual server, the information technology platform, and/or the cloud computing service, rather than a central location where additional routing may be performed. For third party software application, the feedback framework may receive feedback related to the third party software application, and make accessible or send the feedback to developers of the third party software application. In this manner, the feedback framework may ensure that the feedback reaches the relevant parties quickly and conveniently.

With the preceding in mind, the following figures relate to various types of generalized system architectures or configurations that may be employed to provide services to an organization in an instance-based framework on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. Computing system 10 may include a client network 12, network 18 (e.g., the Internet), and a cloud-based platform 20. In some implementations, the cloud-based platform may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 22, and/or other remote networks. As shown in FIG. 1, the client network 12 is able to connect to one or more client devices 14A, 14B, and 14C so that the client devices are able to communicate with each other and/or with the network hosting the platform 20. The client devices 14A-C may be computing systems and/or other types of computing devices generally referred to as Internet of Things (IoT) devices that access cloud computing services, for example, via a web browser application or via an edge device 16 that may act as a gateway between the client devices and the platform 20. FIG. 1 also illustrates that the client network 12 includes an administration or managerial device or server, such as a management, instrumentation, and discovery (MID) server 17 that facilitates communication of data between the network hosting the platform 20, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 18. The network 18 may include one or more computing networks, such as other LANs, wide area networks (WAN), the Internet, and/or other remote networks, to transfer data between the client devices 14A-C and the network hosting the platform 20. Each of the computing networks within network 18 may contain wired and/or wireless programmable devices that operate in the electrical and/or optical domain. For example, network 18 may include wireless networks, such as cellular networks (e.g., Global System for Mobile Communications (GSM) based cellular network), IEEE 802.11 networks, and/or other suitable radio-based networks. The network 18 may also employ any number of network communication protocols, such as Transmission Control Protocol (TCP) and Internet Protocol (IP). Although not explicitly shown in FIG. 1, network 18 may include a variety of network devices, such as servers, routers, network switches, and/or other network hardware devices configured to transport data over the network 18.

In FIG. 1, the network hosting the platform 20 may be a remote network (e.g., a cloud network) that is able to communicate with the client devices 14A-C via the client network 12 and network 18. The network hosting the platform 20 provides additional computing resources to the client devices 14A-C and/or client network 12. For example, by utilizing the network hosting the platform 20, users of client devices 14A-C are able to build and execute applications for various enterprise, IT, and/or other organization-related functions. In one embodiment, the network hosting the platform 20 is implemented on one or more data centers 22, where each data center could correspond to a different geographic location. Each of the data centers 22 includes a plurality of virtual servers 24 (also referred to herein as application nodes, application servers, virtual server instances, application instances, or application server instances), where each virtual server can be implemented on a physical computing system, such as a single electronic computing device (e.g., a single physical hardware server) or across multiple-computing devices (e.g., multiple physical hardware servers). Examples of virtual servers 24 include, but are not limited to a web server (e.g., a unitary web server installation), an application server (e.g., unitary JAVA Virtual Machine), and/or a database server, e.g., a unitary relational database management system (RDBMS) catalog.

To utilize computing resources within the platform 20, network operators may choose to configure the data centers 22 using a variety of computing infrastructures. In one embodiment, one or more of the data centers 22 are configured using a multi-tenant cloud architecture, such that one of the server instances 24 handles requests from and serves multiple customers. Data centers with multi-tenant cloud architecture commingle and store data from multiple customers, where multiple customer instances are assigned to one of the virtual servers 24. In a multi-tenant cloud architecture, the particular virtual server 24 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 24 causing outages for all customers allocated to the particular server instance.

In another embodiment, one or more of the data centers 22 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server and/or other combinations of physical and/or virtual servers 24, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 20, and customer-driven upgrade schedules. An example of implementing a customer instance within a multi-instance cloud architecture will be discussed in more detail below with reference to FIG. 2.

Figure 2:
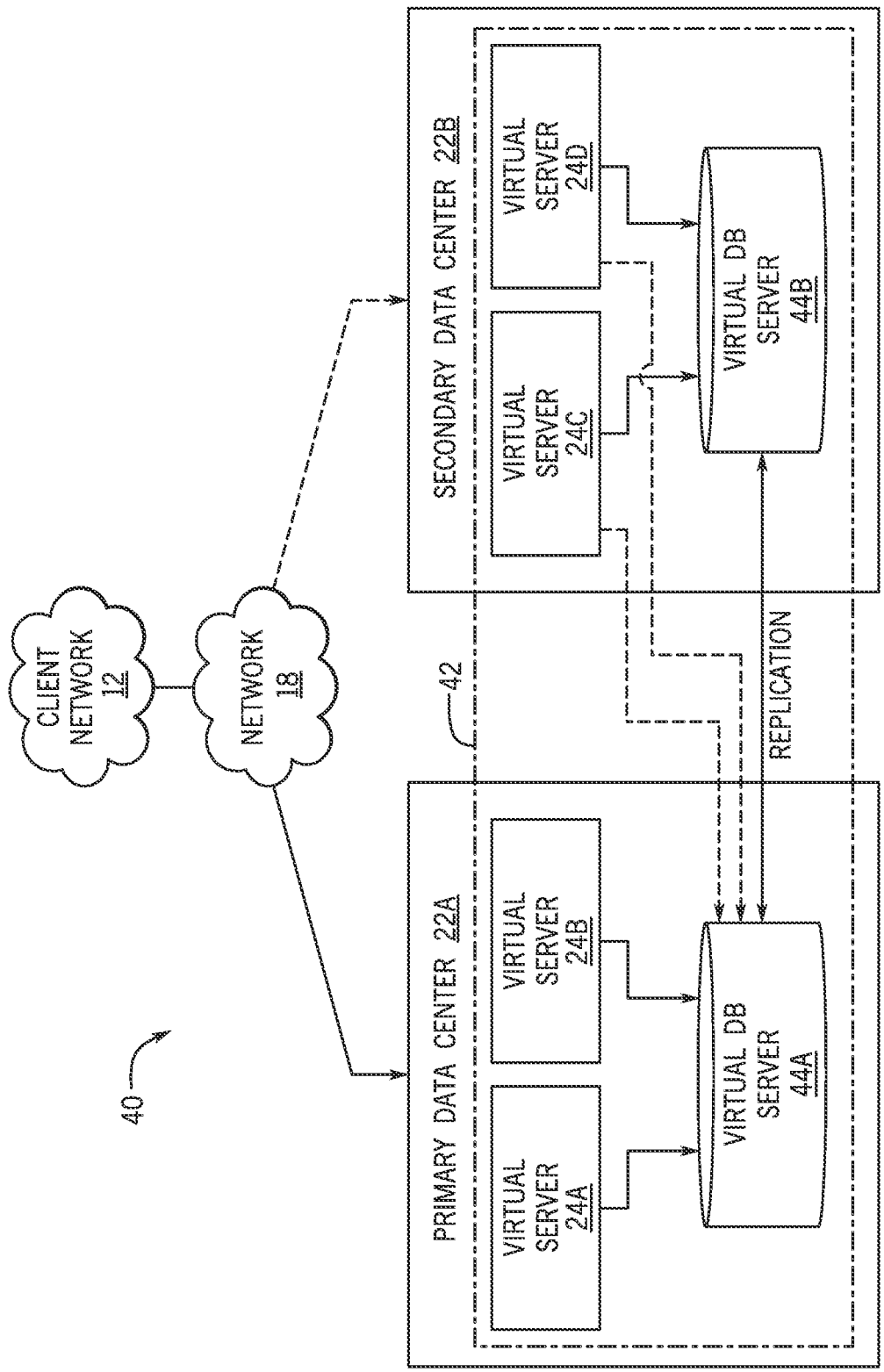
FIG. 2 is a block diagram of an embodiment of a multi-instance cloud architecture in which embodiments of the present disclosure may operate.

FIG. 2 is a schematic diagram of an embodiment of a multi-instance cloud architecture 40 where embodiments of the present disclosure may operate. FIG. 2 illustrates that the multi-instance cloud architecture 40 includes the client network 12 and the network 18 that connect to two (e.g., paired) data centers 22A and 22B that may be geographically separated from one another. Using FIG. 2 as an example, network environment and service provider cloud infrastructure client instance 42 (also referred to herein as a client instance 42) is associated with (e.g., supported and enabled by) dedicated virtual servers (e.g., virtual servers 24A, 24B, 24C, and 24D) and dedicated database servers (e.g., virtual database servers 44A and 44B). Stated another way, the virtual servers 24A-24D and virtual database servers 44A and 44B are not shared with other client instances and are specific to the respective client instance 42. Other embodiments of the multi-instance cloud architecture 40 could include other types of dedicated virtual servers, such as a web server. For example, the client instance 42 could be associated with (e.g., supported and enabled by) the dedicated virtual servers 24A-24D, dedicated virtual database servers 44A and 44B, and additional dedicated virtual web servers (not shown in FIG. 2).

In the depicted example, to facilitate availability of the client instance 42, the virtual servers 24A-24D and virtual database servers 44A and 44B are allocated to two different data centers 22A and 22B, where one of the data centers 22 acts as a backup data center. In reference to FIG. 2, data center 22A acts as a primary data center that includes a primary pair of virtual servers 24A and 24B and the primary virtual database server 44A associated with the client instance 42. Data center 22B acts as a secondary data center 22B to back up the primary data center 22A for the client instance 42. To back up the primary data center 22A for the client instance 42, the secondary data center 22B includes a secondary pair of virtual servers 24C and 24D and a secondary virtual database server 44B. The primary virtual database server 44A is able to replicate data to the secondary virtual database server 44B (e.g., via the network 18).

As shown in FIG. 2, the primary virtual database server 44A may back up data to the secondary virtual database server 44B using a database replication operation. The replication of data between data could be implemented by performing full backups weekly and daily incremental backups in both data centers 22A and 22B. Having both a primary data center 22A and secondary data center 22B allows data traffic that typically travels to the primary data center 22A for the client instance 42 to be diverted to the second data center 22B during a failure and/or maintenance scenario. Using FIG. 2 as an example, if the virtual servers 24A and 24B and/or primary virtual database server 44A fails and/or is under maintenance, data traffic for client instances 42 can be diverted to the secondary virtual servers 24C and/or 24D and the secondary virtual database server instance 44B for processing.

Figure 3:
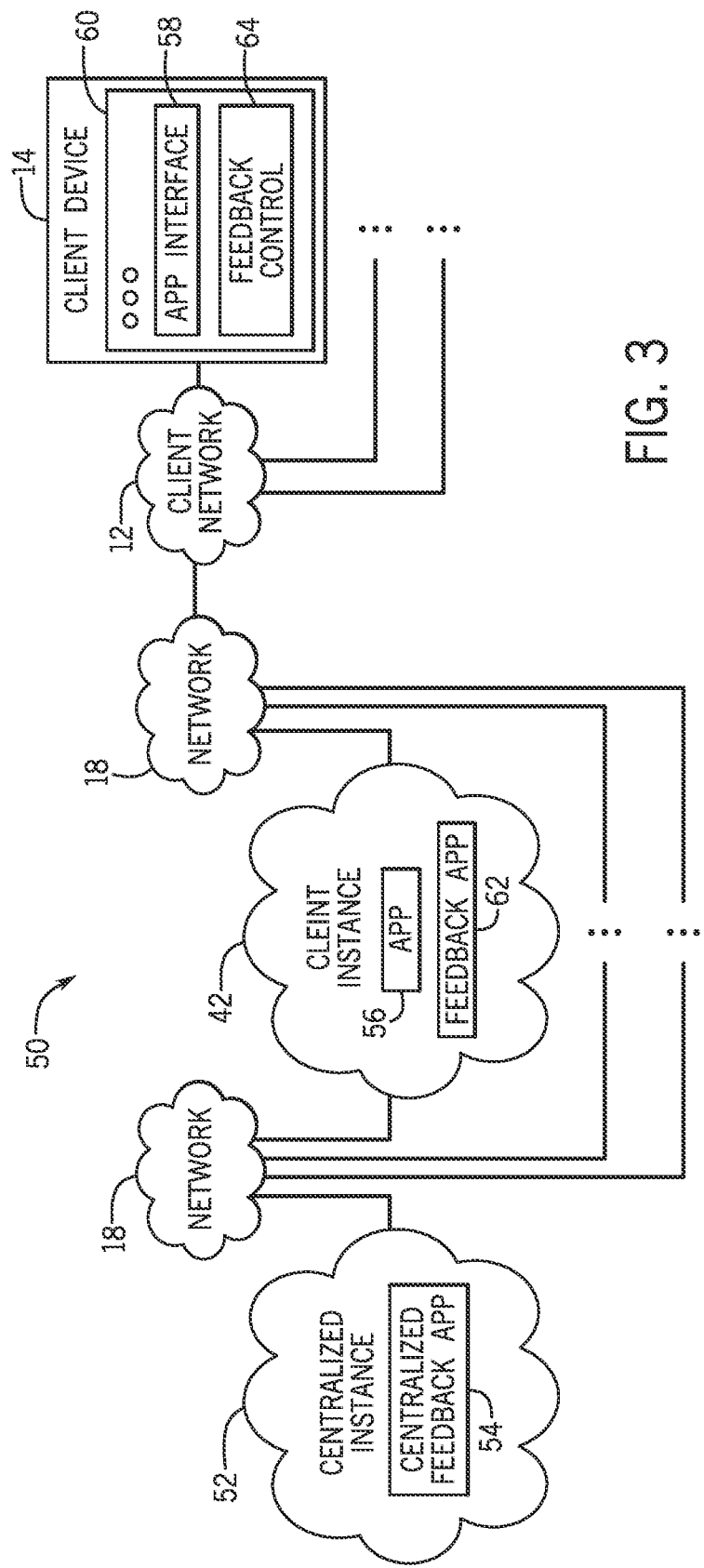
FIG. 3 is a schematic diagram of an embodiment of a feedback framework in a centralized, multi-instance cloud architecture where embodiments of the present disclosure may operate.

FIG. 3 is a schematic diagram of an embodiment of a feedback framework in a centralized, multi-instance cloud architecture 50 where embodiments of the present disclosure may operate. FIG. 3 illustrates that the centralized, multi-instance cloud architecture 50 includes a centralized instance 52 that is connected to one or more client instances 42 by the network 18. Like the client instances 42, the centralized instance 52 may be associated with (e.g., supported and enabled by) dedicated virtual servers (e.g., virtual servers 24A, 24B, 24C, and 24D) and dedicated database servers (e.g., virtual database servers 44A and 44B). The centralized instance 52 may enable management of the client instances 42 and send and receive information to and from the client instances 42.

For example, the centralized instance 52 may store and execute a centralized feedback application 54 of the feedback framework. The centralized feedback application 54 may manage the feedback framework and enable updates, changes, and/or other management functions of the feedback framework. The centralized feedback application 54 may also receive feedback enabled to be received by the feedback framework.

The client instance 42 may include a software application 56 of the cloud-based platform 20 that provides output (e.g., visual output) to the client device 14 and/or receives input from the client device 14 via the network 18 and/or the client network 12. For example, the application 56 may provide an application interface 58 on the client device 14. The application interface 58 may be provided via a web interface of the client device 14, such as a web browser 60 executing on the client device 14. The application 56 may be any suitable software application provided by the cloud-based platform 20, such as an information technology software application, a developer software application, a testing software application, a build software application, a packaging software application, or the like. The application interface 58 may be a client representation of the application 56 that outputs a visual or displayed interface for the application 56 and/or enables the client to provide input for the application 56. For example, the application 56 may be a developer application that provides an interface that enables the client to view source code and receive updates or changes to the source code.

The client instance 42 may also include a feedback application 62 that enables feedback to be received and sent to the centralized feedback application 54. In particular, the feedback application 62 may enable display and use of one or more feedback controls 64 on one or more client devices 14 via the network 18 and/or the client network 12. The feedback control 64 may be provided in any suitable form that enables a client to submit feedback or context information, such as a button, a dial, a dropdown menu, a form, a text field, a text box, and the like. Once submitted, the feedback or context information may be sent to the feedback application 62 executing on the client instance 42, and in turn sent to the centralized feedback application 54 executing on the centralized instance 52. In some embodiments, the feedback control 64 may be embedded or provided as part of a web browser 60 executing on the client device 14. For example, the client may use the cloud-based platform 20 via the browser 60, the feedback control 64 may be part of the cloud-based platform 20, and, as such, the feedback control 64 may be accessible via the browser 60.

Although FIGS. 1-3 illustrate specific embodiments of a cloud computing system 10, a multi-instance cloud architecture 40, and a centralized, multi-instance cloud architecture 50, respectively, the disclosure is not limited to the specific embodiments illustrated in FIGS. 1-3. For instance, although FIG. 1 illustrates that the platform 20 is implemented using data centers, other embodiments of the platform 20 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 24A-D and virtual database servers 44A and 44B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1-3 are only examples to facilitate ease of description and explanation and are not intended to limit the disclosure to the specific examples illustrated therein.

As may be appreciated, the respective architectures and frameworks discussed with respect to FIGS. 1-3 incorporate computing systems of various types (e.g., servers, workstations, client devices, laptops, tablet computers, cellular telephones, and so forth) throughout. For the sake of completeness, a brief high level overview of components typically found in such systems is provided. As may be appreciated, the present overview is intended to merely provide a high-level, generalized view of components typical in such computing systems and should not be viewed as limiting in terms of components discussed or omitted from discussion.

Figure 4:
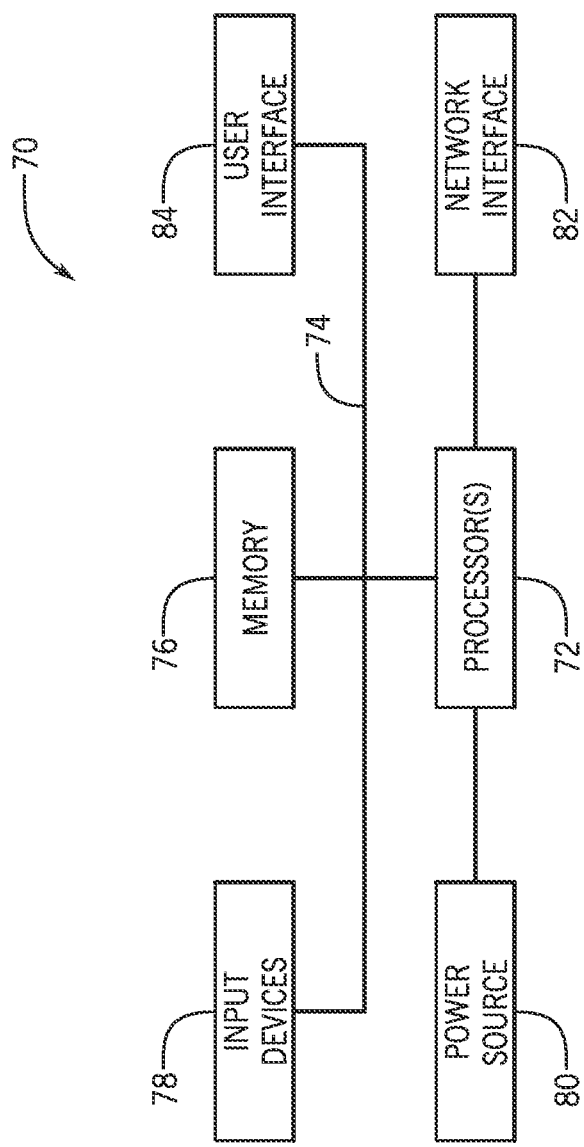
FIG. 4 is a block diagram of a computing device utilized in a computing system that may be present in FIGS. 1-3, in accordance with aspects of the present disclosure.

By way of background, it may be appreciated that the present approach may be implemented using one or more processor-based systems such as shown in FIG. 4. Likewise, applications and/or databases utilized in the present approach stored, employed, and/or maintained on such processor-based systems. As may be appreciated, such systems as shown in FIG. 4 may be present in a distributed computing environment, a networked environment, or other multi-computer platform or architecture. Likewise, systems such as that shown in FIG. 4, may be used in supporting or communicating with one or more virtual environments or computational instances on which the present approach may be implemented.

With this in mind, an example computer system may include some or all of the computer components depicted in FIG. 4. FIG. 4 generally illustrates a block diagram of example components of a computing system 70 and their potential interconnections or communication paths, such as along one or more busses. As illustrated, the computing system 70 may include various hardware components such as, but not limited to, one or more processors 72, one or more busses 74, memory 76, input devices 78, a power source 80, a network interface 82, a user interface 84, and/or other computer components useful in performing the functions described herein.

The one or more processors 72 may include one or more microprocessors capable of performing instructions stored in the memory 76. Additionally or alternatively, the one or more processors 72 may include application-specific integrated circuits (ASICs), field-programmable gate arrays (FPGAs), and/or other devices designed to perform some or all of the functions discussed herein without calling instructions from the memory 76.

With respect to other components, the one or more busses 74 include suitable electrical channels to provide data and/or power between the various components of the computing system 70. The memory 76 may include any tangible, non-transitory, and computer-readable storage media. Although shown as a single block in FIG. 4, the memory 76 can be implemented using multiple physical units of the same or different types in one or more physical locations. The input devices 78 correspond to structures to input data and/or commands to the one or more processor 72. For example, the input devices 78 may include a mouse, touchpad, touchscreen, keyboard and the like. The power source 80 can be any suitable source for power of the various components of the computing system 70, such as line power and/or a battery source. The network interface 82 includes one or more transceivers capable of communicating with other devices over one or more networks (e.g., a communication channel). The network interface 82 may provide a wired network interface or a wireless network interface. A user interface 84 may include a display that is configured to display text or images transferred to it from the one or more processors 72. In addition and/or alternative to the display, the user interface 84 may include other devices for interfacing with a user, such as lights (e.g., LEDs), speakers, and the like.

The present disclosure includes embodiments of the client device 14, the client instance 42, the virtual server 24, the cloud-based platform 20, the cloud computing system 10, and/or the computing system 70 that provide a feedback framework which obtains context information associated with the software application 56, the web browser 60 executing the software application 56, the client device 14, the client instance 42, the virtual server 24, the cloud-based platform 20, the cloud computing system 10, and/or the computing system 70, being used by a client.

Figure 5:
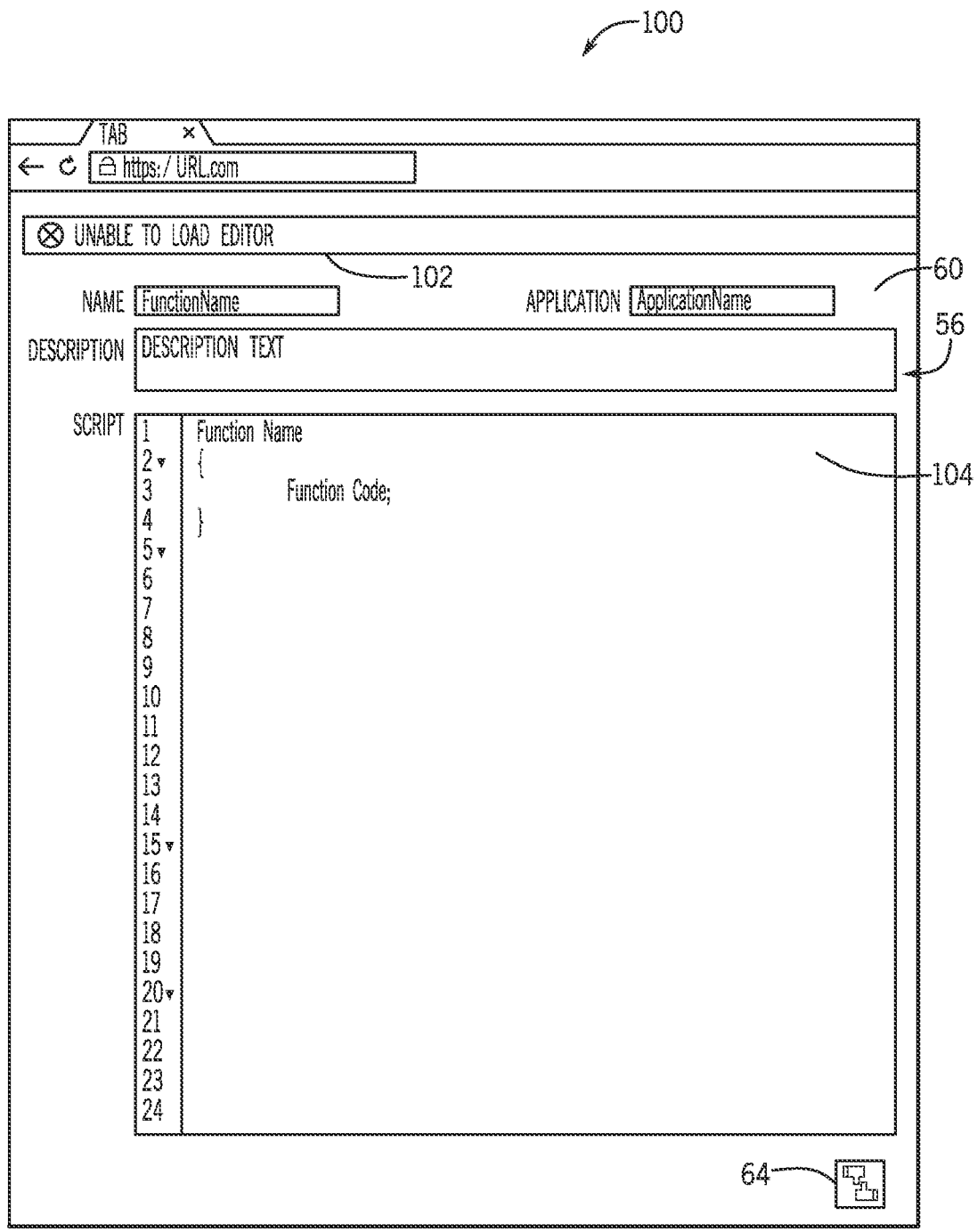
FIG. 5 is an example page of a developer application of a cloud-based platform as displayed on a web browser of a client device of FIG. 3, according to embodiments of the present disclosure.

FIG. 5 is an example page 100 of a developer application (e.g., 56) of the cloud-based platform 20 as displayed on a web browser 60 of a client device 14 of FIG. 3, according to embodiments of the present disclosure. In particular, the example page 100 may be displayed by the displayed interface of the application interface 58, such as the user interface 84. As illustrated, an error 102 is displayed on the page 100 when a client, for example, attempts to load an editor to edit a function 104. As a result, the client may desire to provide feedback to notify a developer or information technology specialist associated with the software application 56 executing the page 100, the web browser 60, the client device 14, the client instance 42, the virtual server 24, the cloud-based platform 20, the cloud computing system 10, and/or the computing system 70, that the error 102 occurred. The cloud-based platform 20 may provide a feedback control 64 (e.g., a button or icon) of the feedback framework that, when selected, enables the client to submit feedback.

Figure 6:
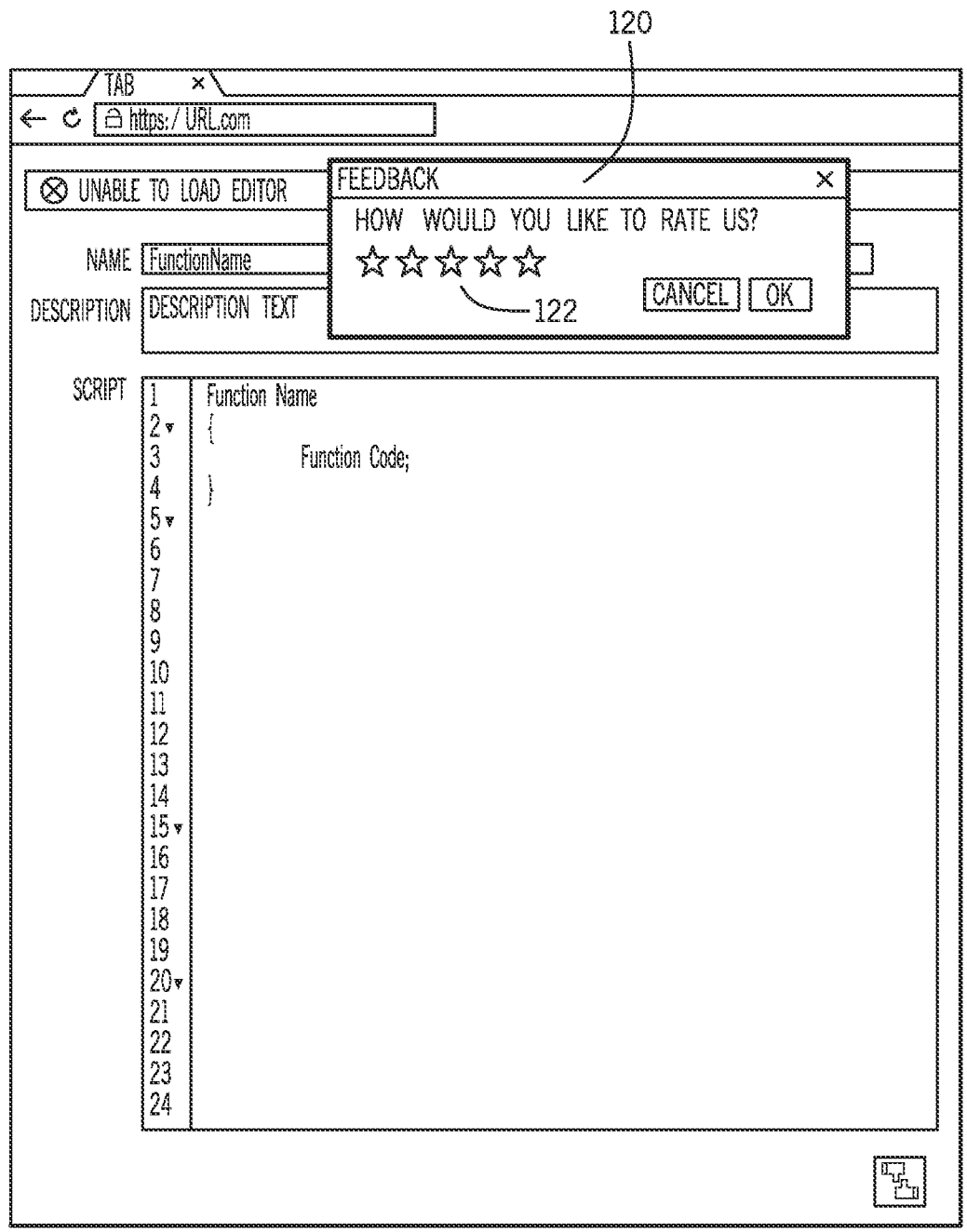
FIG. 6 is an example feedback form of the feedback framework that is displayed in response to selecting a feedback control shown in FIG. 5, according to embodiments of the present disclosure.

FIG. 6 is an example feedback form 120 of the feedback framework that is displayed in response to selecting the feedback control 64 shown in FIG. 5, according to embodiments of the present disclosure. The feedback form 120 may enable the client to provide positive or negative feedback relating to the software application 56, the web browser 60, the client device 14, the client instance 42, the virtual server 24, the cloud-based platform 20, the cloud computing system 10, and/or the computing system 70, by any suitable technique. As illustrated, the feedback form 120 includes a feedback input control 122 that enables the client to provide feedback in the form of a 1-5 star rating. In additional or alternative embodiments, the feedback form 120 may include one or more buttons, dials, text fields, arrows, icons, or any other suitable form of providing feedback.

Figure 7:
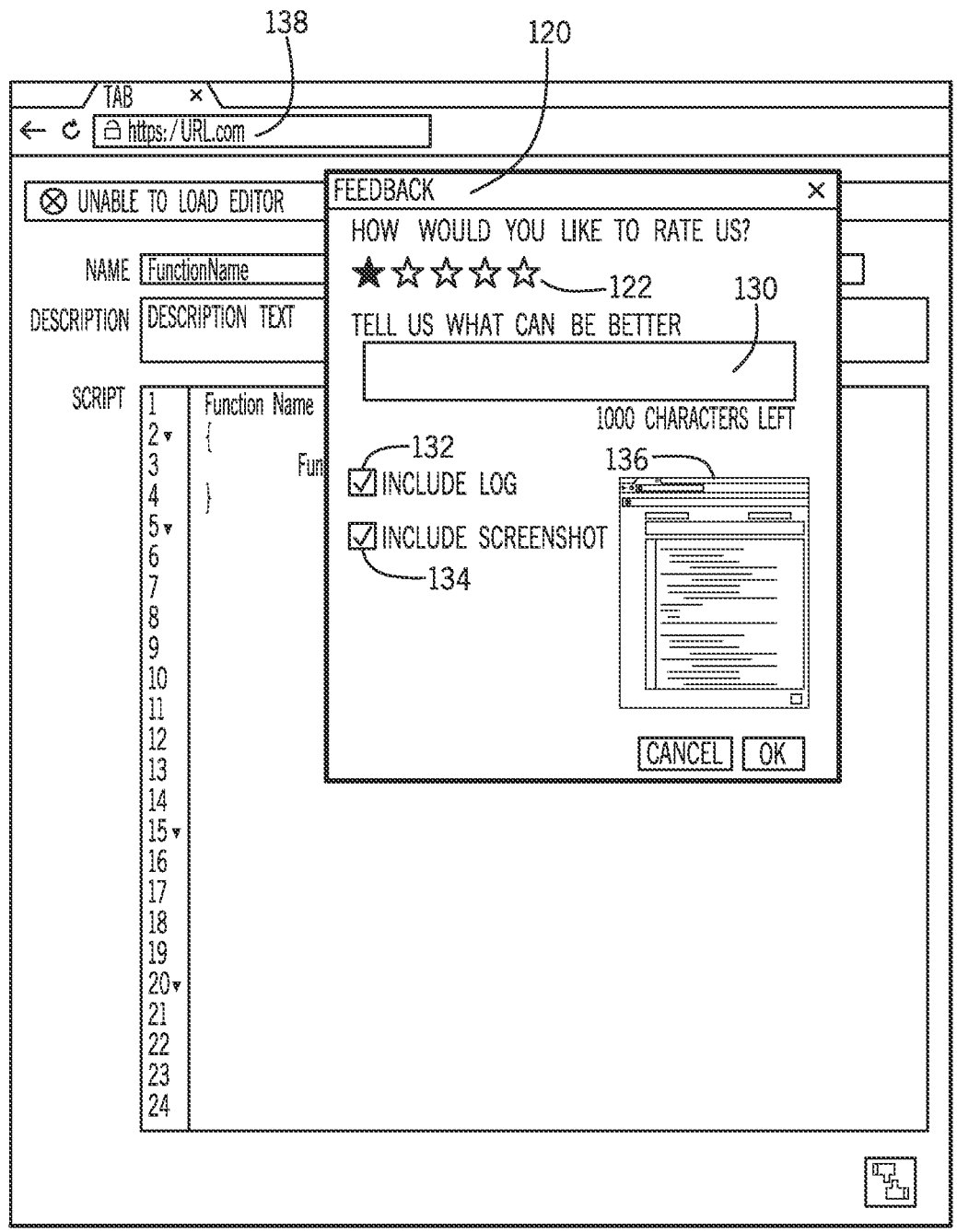
FIG. 7 is an expanded view of the example feedback form of FIG. 6 that enables a client to provide additional feedback, according to embodiments of the present disclosure.

In some embodiments, after providing initial feedback (e.g., via the feedback input control 122), the feedback form 120 may enable the client to provide additional feedback or context information. FIG. 7 is an expanded view of the example feedback form 120 of FIG. 6 that enables the client to provide additional feedback, according to embodiments of the present disclosure. In particular, after the client enters a 1-5 star rating using the feedback input control 122, the feedback form 120 may expand and provide additional feedback input controls 130, 132, 134.

As illustrated, feedback input control 130 is a text box that enables the client to enter text as feedback. Feedback input control 132 is a checkbox that enables the client to submit a system log (e.g., an application log, event log, process log, etc.) as context information. The system log may include a log file or a portion of the log file that records events that occur in the operating system of the client device 14, the software application 56, the web browser 60, the client device 14, the client instance 42, the virtual server 24, the cloud-based platform 20, the cloud computing system 10, and/or the computing system 70. As such, events prior to the error 102 occurring may be recorded in the log, and be used to provide context and facilitate diagnosing a cause of the error 102. Advantageously, because the feedback input control 132 automatically enables the client to submit the log to a developer or information technology specialist, the client may avoid having to manually download and send the system log.

Feedback input control 134 is a checkbox that enables the client to submit a screenshot 136 as context information. The screenshot 136 may capture the webpage the client was visiting when the error 102 occurred, field values, error messages, and the like, and thus provide context and facilitate diagnosing a cause of the error 102. Advantageously, because the feedback input control 134 automatically enables the client to submit the screenshot 136 to a developer or information technology specialist, the client may avoid having to manually download and send the screenshot 136. The centralized feedback application 54 executing on the centralized instance 52, the feedback application 62 executing on the client instance 42, the feedback control 64, and the feedback input controls 122, 130, 132, 134, are referred to as components of the feedback framework in the present disclosure.

As such, FIG. 7 illustrates the client providing feedback or context information in the form of a rating, text, a system log, and a screenshot 136, using feedback input controls 122, 130, 132, and 134, respectively. The feedback or context information may then be sent from the feedback input controls 122, 130, 132, 134 to the feedback application 62 executing on the client instance 42, and then forwarded to the centralized feedback application 54 executing on the centralized instance 52. The centralized feedback application 54 may make the feedback or context information accessible to information technology specialists, developers, or any other appropriate persons via any suitable technique (e.g., via a problem or incident ticket, notification, message, or email), where the error 102 may be addressed by viewing the feedback or context information.

It should be understood that the feedback or context information may be in any suitable form beyond what is described in FIG. 7, such as a web address or Uniform Resource Locator (URL) 138, version information (e.g., of the software application 56, the web browser 60, the operating system of the client device 14, the cloud-based platform 20, and/or the cloud computing system 10), identification of the component (e.g., of the cloud computing system 10) for which feedback is provided (e.g., a function or object name), CPU health information, network health information, prompts or error messages, and/or the like. Moreover, in some embodiments, some context information may be sent to the feedback application 62 (and ultimately to the centralized feedback application 54) without client action (e.g., selecting a checkbox). For example, while the feedback framework may send the system log to the feedback application 62 if the client selects the feedback input control 132, the feedback framework may send the error 102 and the URL 138 of the web browser 60 without input or selection of the client. In this manner, the information technology specialists or developers may receive, for example, the rating and the text feedback from the client, as well sufficient context information, such as the system log, the screenshot 136, the error 102, and the URL 138, to properly diagnose and address the error 102.

Figure 8:
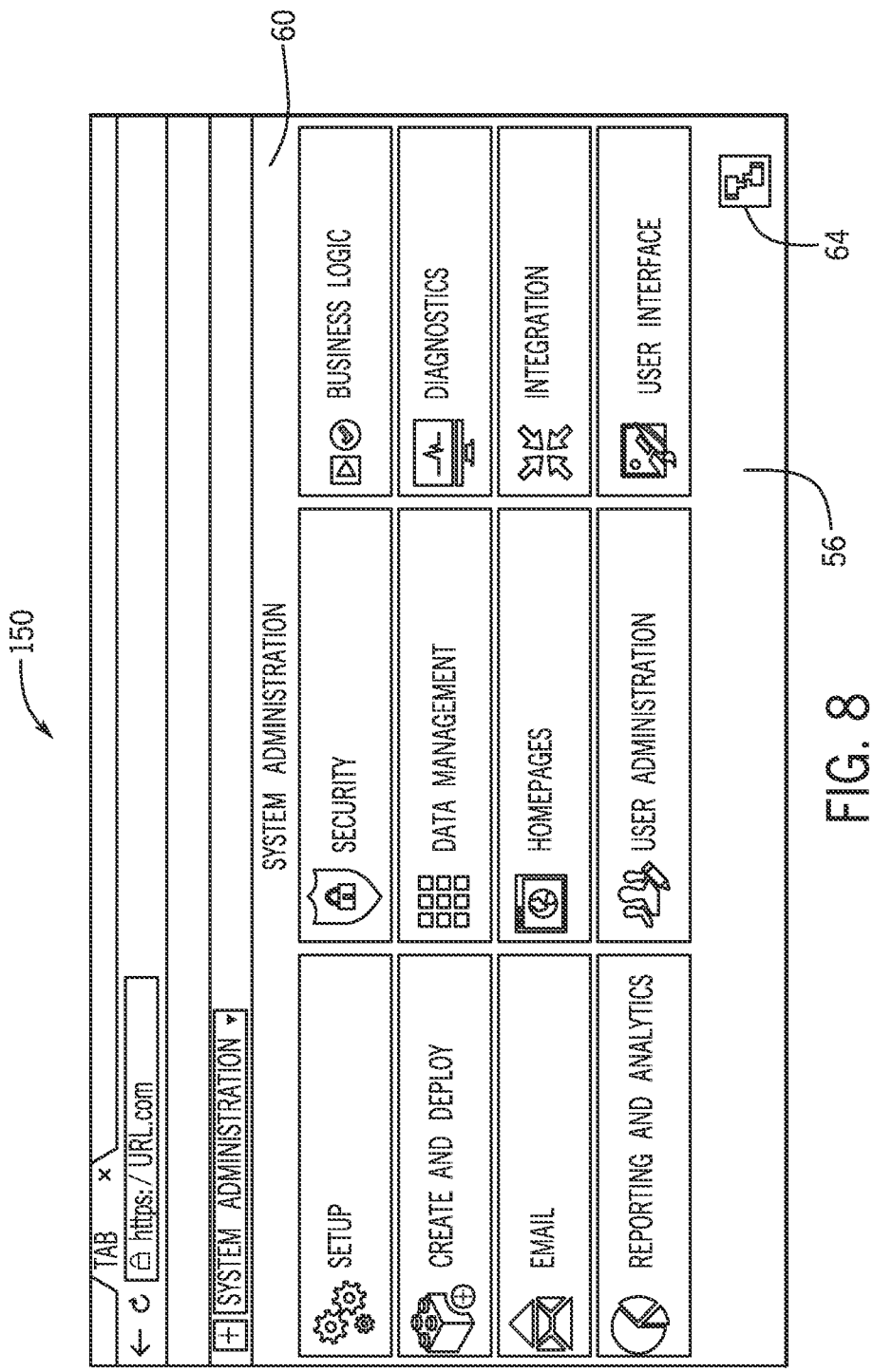
FIG. 8 is an example page of a system administration application of a cloud-based platform as displayed on a web browser of a client device of FIG. 3, according to embodiments of the present disclosure.

FIG. 8 is an example page 150 of a system administration application (e.g., 56) of the cloud-based platform 20 as displayed on a web browser 60 of a client device 14 of FIG. 3, according to embodiments of the present disclosure. In this example, the client may desire to provide positive feedback to notify a developer or information technology specialist associated with the software application 56 executing the page 100, the web browser 60, the client device 14, the client instance 42, the virtual server 24, the cloud-based platform 20, the cloud computing system 10, and/or the computing system 70, that the client approves, is impressed by, or likes the page 150. The cloud-based platform 20 provides the feedback control 64 (e.g., a button or icon) of the feedback framework that, when selected, enables the client to submit such feedback.

Figure 9:
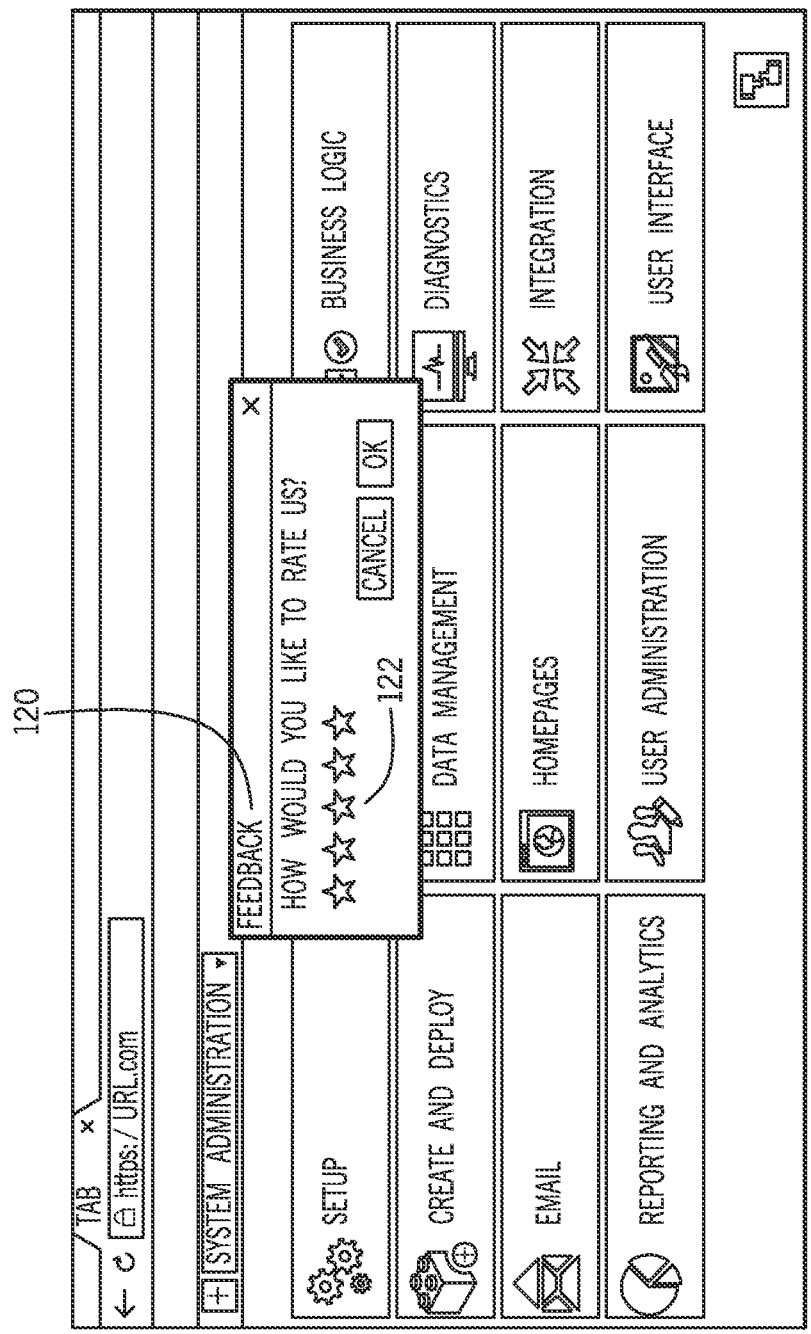
FIG. 9 is an example feedback form of a feedback framework that is displayed in response to selecting a feedback control shown in FIG. 8, according to embodiments of the present disclosure.

FIG. 9 is the example feedback form 120 of the feedback framework that is displayed in response to selecting the feedback control 64 shown in FIG. 8, according to embodiments of the present disclosure. The feedback form 120 may enable the client to provide positive (or negative) feedback relating to the software application 56, the web browser 60, the client device 14, the client instance 42, the virtual server 24, the cloud-based platform 20, the cloud computing system 10, and/or the computing system 70, by any suitable technique. As illustrated, the feedback form 120 includes the feedback input control 122 that enables the client to provide feedback in the form of a 1-5 star rating.

Figure 10:
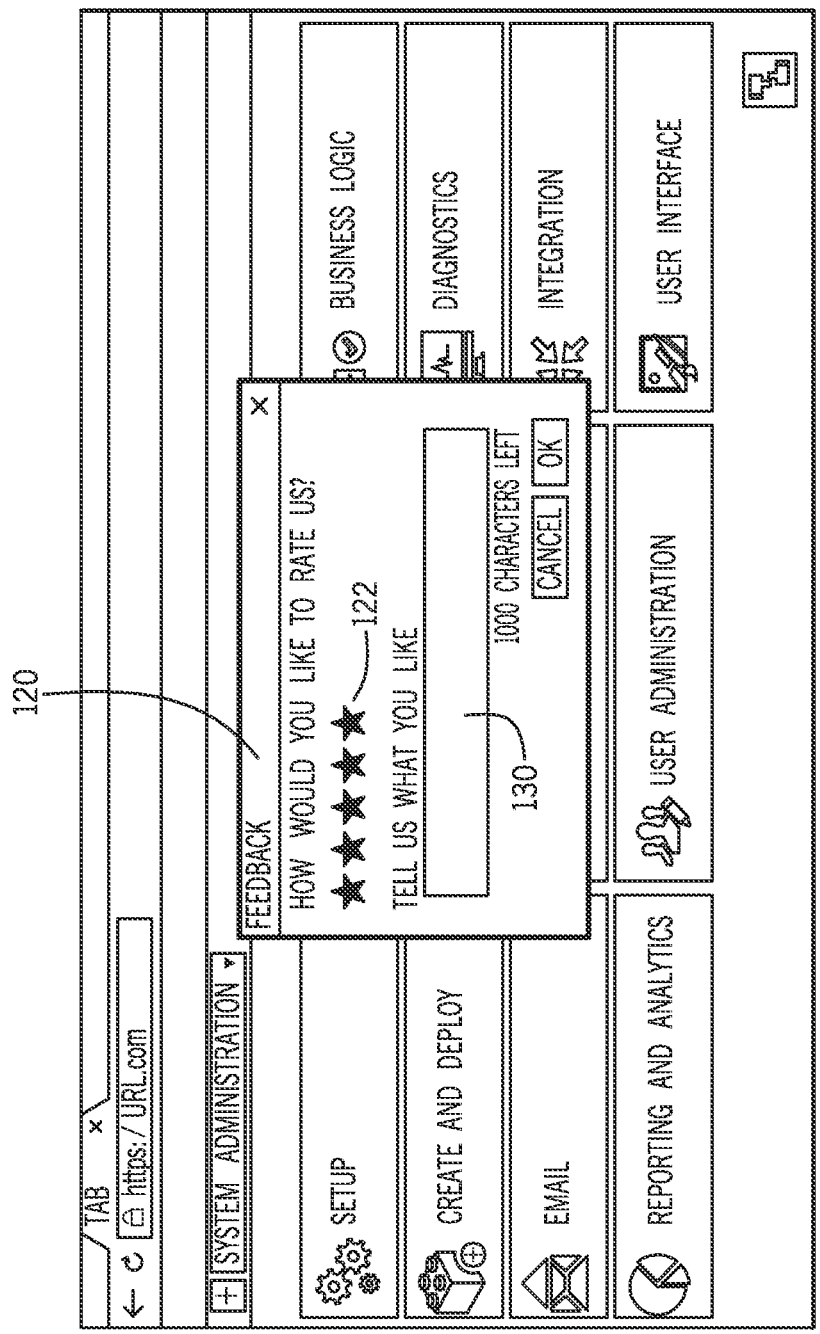
FIG. 10 is an expanded view of the example feedback form of FIG. 9 that enables a client to provide additional feedback, according to embodiments of the present disclosure.

After providing initial feedback (e.g., via the feedback input control 122), the feedback form 120 may enable the client to provide additional feedback or context information. FIG. 10 is an expanded view of the example feedback form 120 of FIG. 9 that enables the client to provide additional feedback, according to embodiments of the present disclosure. In particular, after the client enters a positive or perfect rating (e.g., 4 or 5 stars) using the feedback input control 122, the feedback form 120 may expand and provide the additional feedback input control 130. As illustrated, the feedback input control 130 is a text box that enables the client to enter text as feedback. In particular, certain feedback controls, such as the feedback input controls 132, 134 that enable the client to send system logs and screenshots, respectively, may not be enabled or displayed since the feedback is positive. In some embodiments, such feedback input controls 132, 134 may be customized (e.g., by a developer or client) to be enabled even in the case of positive feedback. As such, an information technology specialist or developer may receive, for example, the positive rating and text feedback from the client, and track which pages, components, or the like, have received positive ratings and feedback, and develop similar applications.

Figure 11:
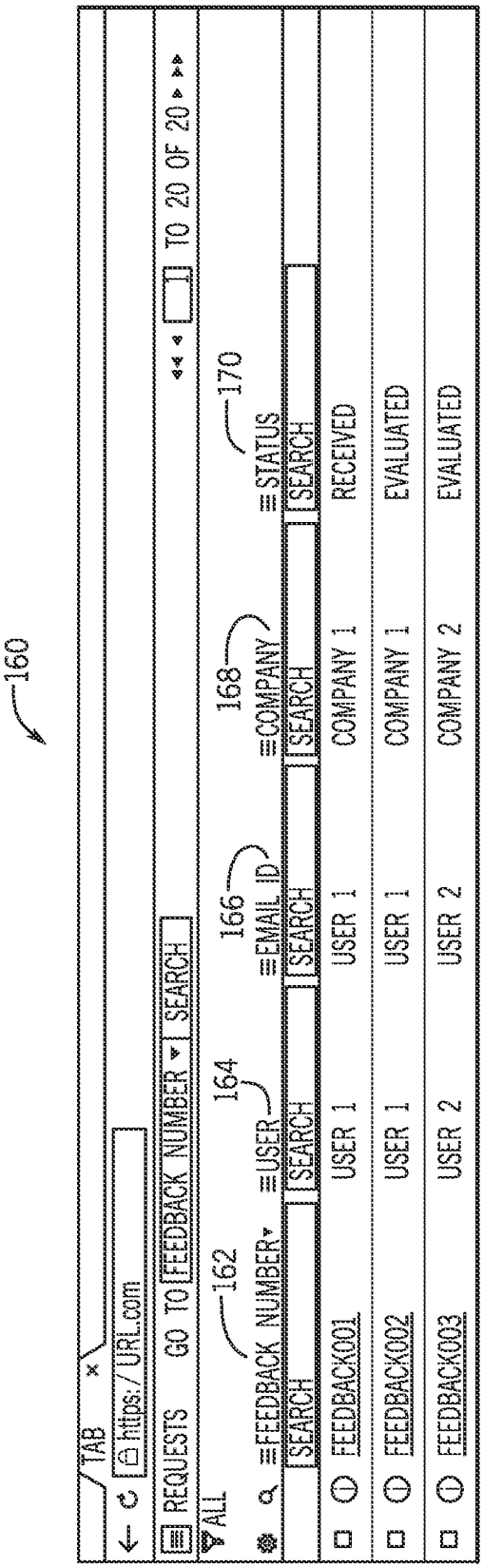
FIG. 11 is an example page of a feedback framework that lists feedback received from client devices of FIG. 3, according to embodiments of the present disclosure.

As mentioned above, the feedback or context information may be sent from the feedback input controls 122, 130, 132, 134 to the feedback application 62 executing on the client instance 42, and then forwarded to the centralized feedback application 54 executing on the centralized instance 52. For example, FIG. 11 is an example page 160 of the feedback framework that lists feedback received from the client devices 14 of FIG. 3, according to embodiments of the present disclosure. In particular, the page 160 illustrates feedback 162 received from multiple users 164, information related to the users (e.g., email addresses 166 and companies 168 that the users work for), and statuses 170 of the feedback 162. The listing may provide a convenient way for an information technology specialist or developer to view feedback 162 and information related to the feedback 162.

Figure 12:
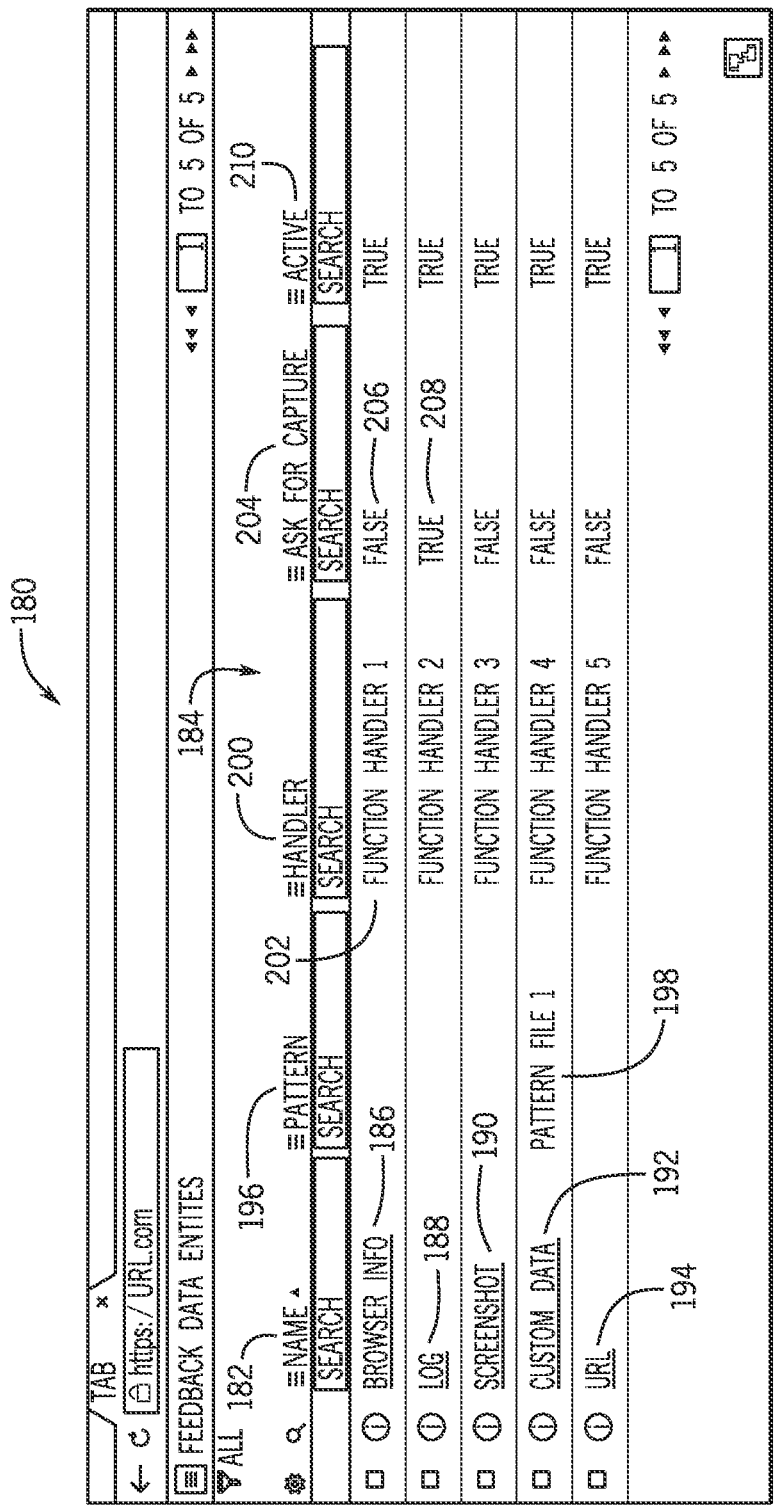
FIG. 12 is an example page of a feedback framework that lists types of feedback or context information to be obtained by a feedback framework and sent to a centralized feedback application as shown in FIG. 3, according to embodiments of the present disclosure.

FIG. 12 is an example page 180 of the feedback framework that lists types of feedback or context information (e.g., feedback data entities 182) to be obtained by the feedback framework and sent to the centralized feedback application 54, according to embodiments of the present disclosure. In particular, the page 180 includes a table 184 that illustrates that browser information 186 (e.g., browser name or type, browser version, and the like), a system log 188, a screenshot 190, custom data 192 (which may be defined by a developer or the client), and a URL 194 may be types of feedback data entities 182 that may be gathered. It should be understood that the illustrated feedback data entities 182 are examples, and any suitable other type of feedback or context information may be gathered and listed as a feedback data entity 182 in the table 184, such as the component (e.g., of the cloud computing system 10) for which the feedback has been provided.

The table 184 also lists corresponding patterns 196 that may be used to identify certain feedback data entities 182. As illustrated, for the custom data entity 192, a developer or client may provide a pattern file 198 that includes a function or object that identifies the custom data entity 192. For example, the custom data entity 192 may include a portion of metadata associated with the page 180, and the pattern file 198 may include a function that identifies the portion of metadata to retrieve and send as a feedback data entity 182.

The table 184 lists handlers 200 (e.g., routines, functions, or methods) that retrieve corresponding feedback data entities 182. For example, a first function handler 202 may retrieve browser information 186. The table 184 also lists whether a client should be asked 204 before capturing a corresponding feedback data entity 182. For example, for browser information 186, the table 184 lists "false" 206. As such, the client will not be asked before capturing browser information 186. As another example, for a system log 188, the table lists "true" 208. As such, the feedback framework will ask the client before capturing the system log 188. In particular, as seen in FIG. 7, the feedback framework may provide a feedback input control 132 in the form of a checkbox that enables the client to submit the system log 188 as context information. Additionally, the table 184 lists whether gathering a feedback data entity 182 is active or enabled 210. As such, the table 184 may provide a convenient way for an information technology specialist or developer to view, configure, and adjust feedback data entities 182 and information related to the feedback data entities 182.

An additional feedback data entity 182 that the feedback framework may obtain and send to the centralized feedback application 54 is an identity of the component (e.g., of the cloud computing system 10) that the feedback is related to. The component may include any suitable entity that the feedback may be provided for, such as the software application 56, the web browser 60, the client device 14, the client instance 42, the virtual server 24, the cloud-based platform 20, the cloud computing system 10, and/or the computing system 70. For example, for the error 102 in FIG. 5, the component may be the cloud-based platform 20 that attempts but fails to load the editor. As another example, for the system administration page 60 in FIG. 8 for which positive feedback is submitted, the component may be the software application 56 that provides functionality for the system administration page 60. In each case, the feedback framework may send a name, identification number, or other identification information of the component to the centralized feedback application 54.

Figure 13:
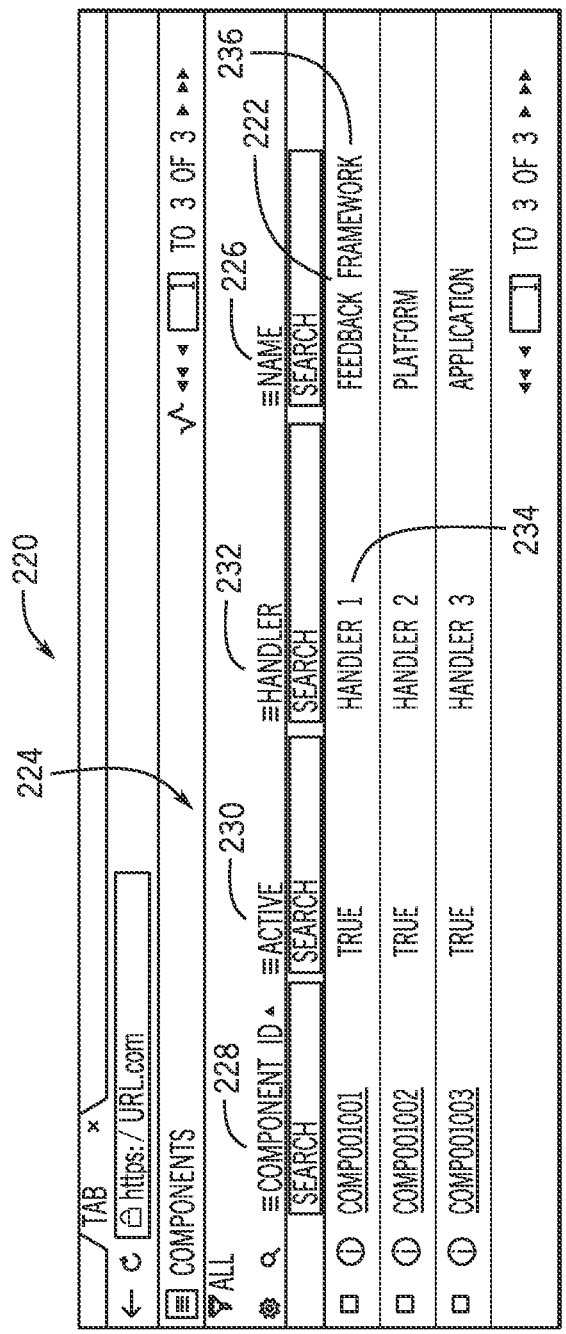
FIG. 13 is an example page of a feedback framework that lists components that may be identified by the feedback framework, according to embodiments of the present disclosure.

FIG. 13 is an example page 220 of the feedback framework that lists components 222 that may be identified by the feedback framework, according to embodiments of the present disclosure. In particular, the page 220 includes a table 224 that lists names 226, identification numbers 228, statuses 230, and handlers 232 of the components 222. As illustrated, the components 222 may include the feedback framework 234, the cloud-based platform 20, and the software application 56, though any suitable component may be listed as components 222 in the table 224, such as the web browser 60, the client device 14, the client instance 42, the virtual server 24, the cloud computing system 10, and/or the computing system 70. The status 230 of a component 222 indicates whether the identification of the component 222 by the feedback framework is enabled. In some embodiments, a developer or the client may enable or disable identification of the component 222. The handler 232 of a component 222 is a routine, function, or method that identifies the component 222. For example, a first handler 234 may identify feedback framework components 236.

Figure 14:
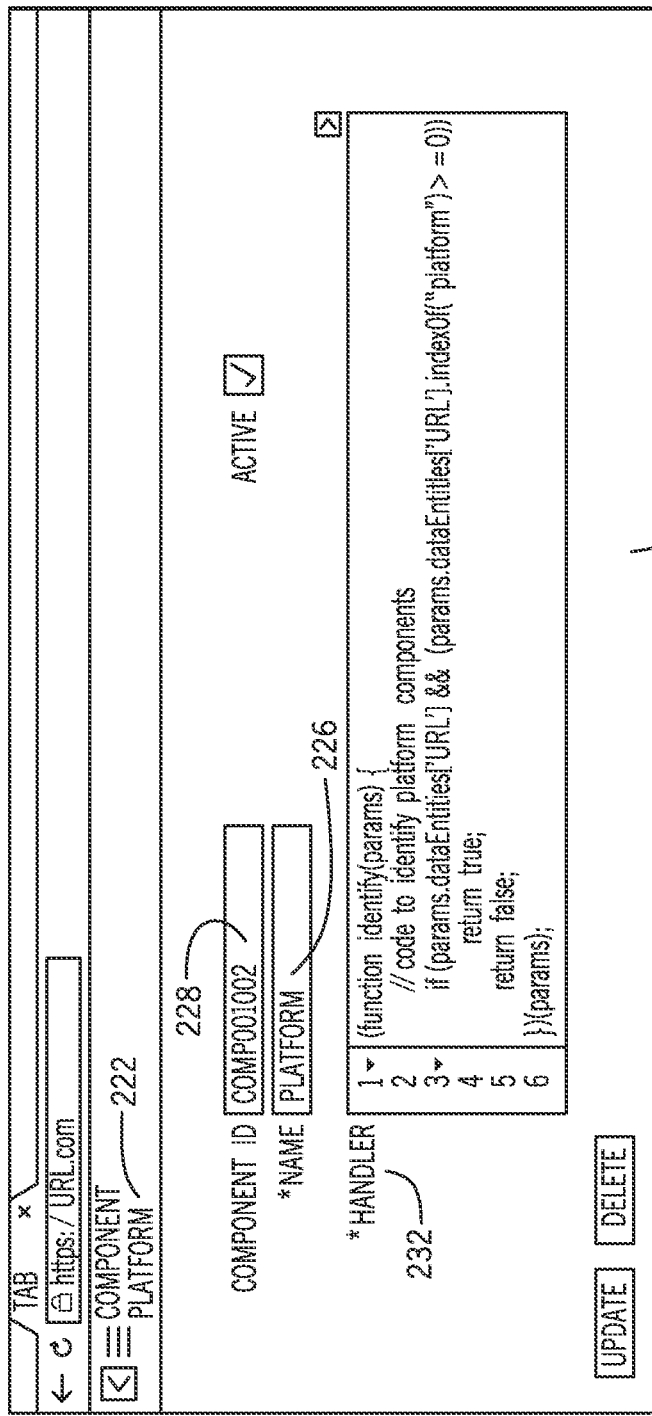
FIG. 14 is an example page of a feedback framework that provides a handler that identifies a component, according to embodiments of the present disclosure.

FIG. 14 is an example page 250 of the feedback framework that provides a handler 232 that identifies a component 222, according to embodiments of the present disclosure. As illustrated, the handler 232 is a function that identifies the component 222 based on a URL 194 of the browser 60. For example, the platform component 222 may be associated with certain portions of the URL 194. When feedback is submitted by the client, the handler 232 may obtain and parse the URL 194. If the URL 194 includes these certain portions, then the handler 232 may identify the component 222 for which the feedback has been submitted is as the platform component 222. While the illustrated handler 232 uses the URL 194 of the browser 60 to identify the component 222, it should be understood that any technique (e.g., such as any other pattern recognition technique) may be used to identify the component 222, such as parsing metadata of the browser 60, parsing text of the feedback submitted by the client, parsing the system log 188, using text character recognition of the screenshot 190, and/or the like. Moreover, the feedback framework enables the client or a developer to add custom handlers 232 to identify additional existing components 222 or custom components developed by the client or the developer, such as third party software applications. In this manner, even software applications that were not originally part of the cloud computing system 10.

Figure 15:
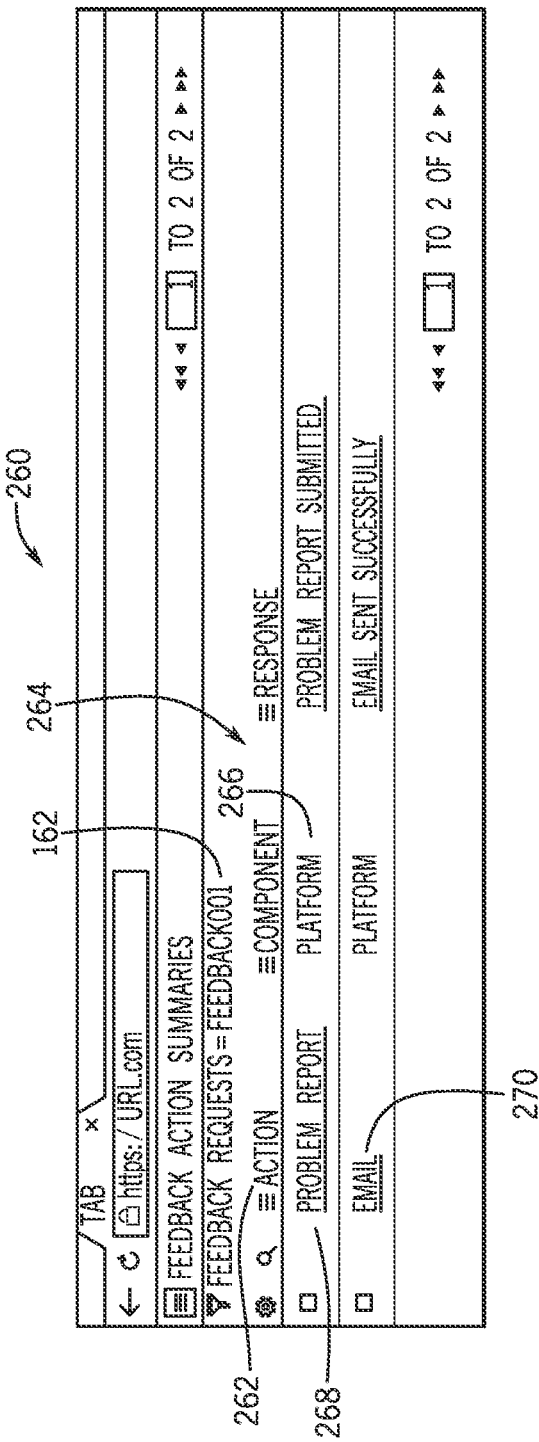
FIG. 15 is an example page of a feedback framework that lists actions taken when a handler identifies a component, according to embodiments of the present disclosure.

When a component 222 has been identified by a handler 232, the feedback framework may notify a developer or information technology specialist associated with the component 222. FIG. 15 is an example page 260 of the feedback framework that lists actions 262 taken when a handler 232 identifies a component 222, according to embodiments of the present disclosure. In particular, certain actions 262 may be associated with certain components 222. As illustrated, the page 260 includes a table 264 that lists actions 262 taken for feedback 162, which was submitted for platform component 266. The actions 262 taken for the platform component 266 include submitting a problem record 268 (e.g., to a problem record repository) and sending the submitted feedback 162 via an email 270 (e.g., to a developer of or information technology specialist maintaining the platform component 266). In this manner, the feedback 162 may be quickly and conveniently sent to relevant persons, rather than a central location where the feedback 162 may be stored for a time before being distributed.

Figure 16:
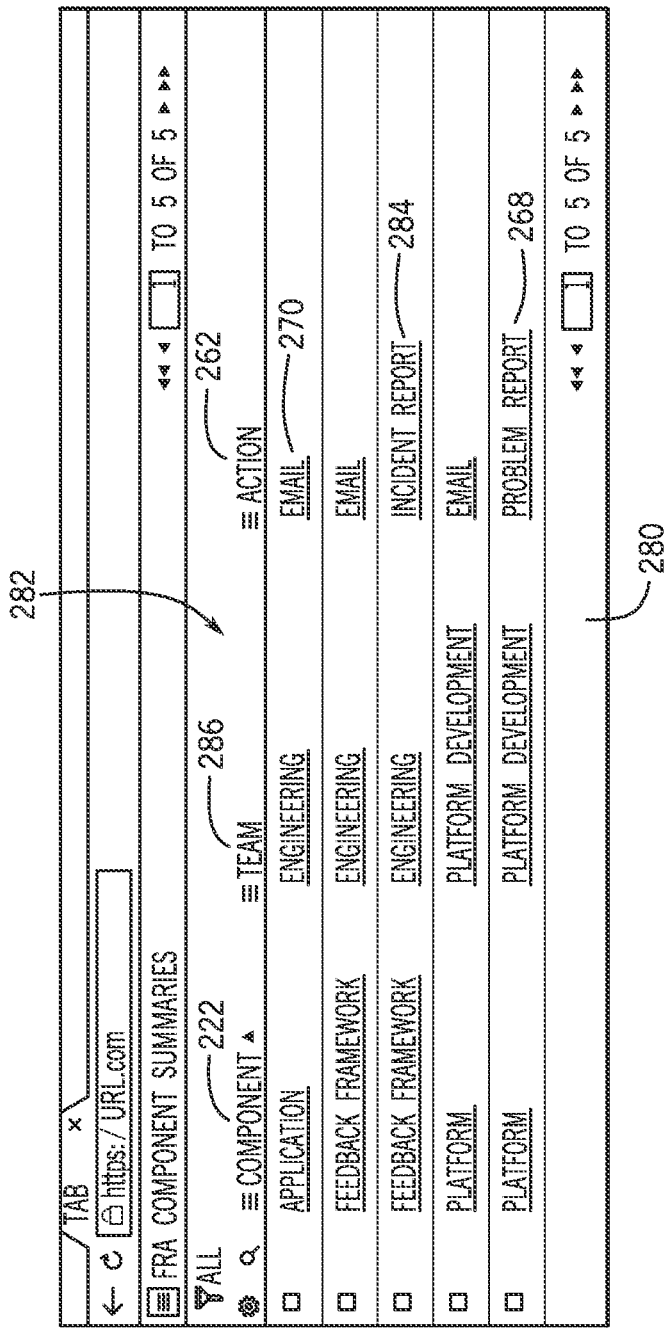
FIG. 16 is another example page of a feedback framework that lists actions that users may configure to be taken when a handler identifies a component, according to embodiments of the present disclosure.

FIG. 16 is another example page 280 of the feedback framework that lists actions 262 that users may configure to be taken when a handler 232 identifies a component 222, according to embodiments of the present disclosure. As illustrated, the page 280 includes a table 282 that lists actions 262 taken for different components 222. The actions 262 may be configured or set by users from a set of all possible actions that may be taken when the handler 232 identifies the respective component 222. The actions 262 include submitting a problem record 268, sending an email 270, and submitting an incident report 284, though any suitable action to be taken with respect to submitted feedback is contemplated. The table 282 also lists departments or teams 286 for which the action 262 is submitted or sent to. As such, members of the teams 286 may be notified by the action 262. In some embodiments, each action 262 may be associated with a feedback action table which maps or associates the action 262 to a handler, function, script, portion of computer code, or software (e.g., instructions executable by the processor 72 or any other suitable processor) that performs the action 262.

Figure 17:
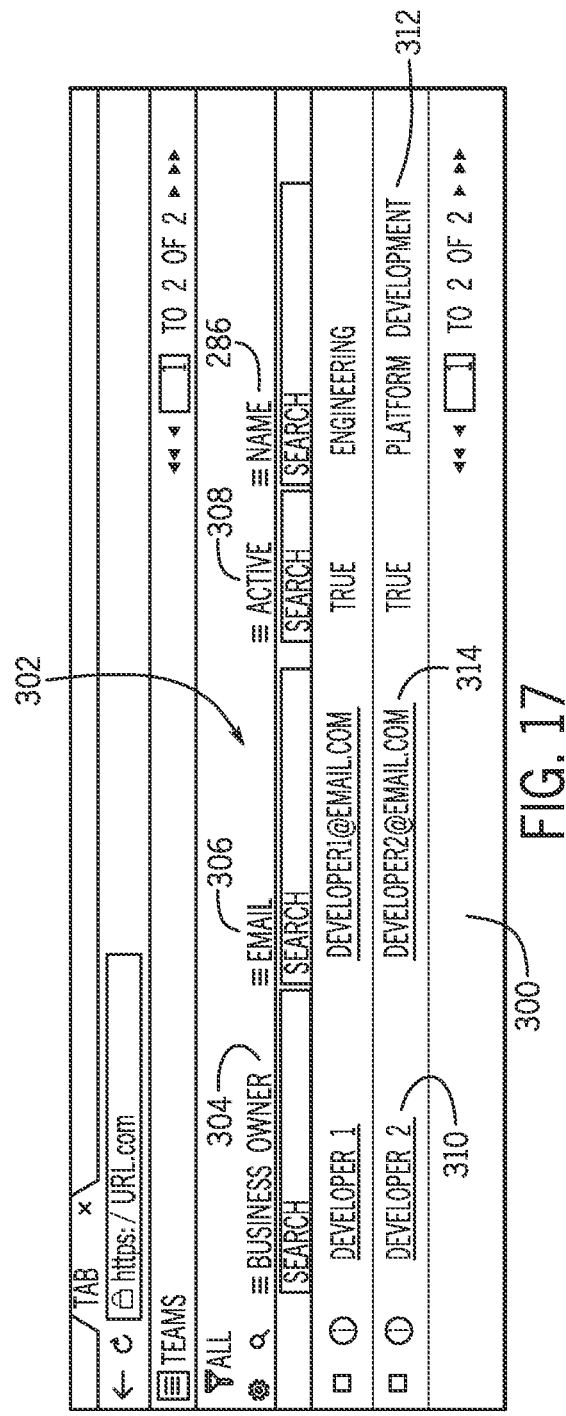
FIG. 17 is an example page of a feedback framework that lists team members to be contacted when a handler identifies a component, according to embodiments of the present disclosure.

FIG. 17 is an example page 300 of the feedback framework that lists team members to be contacted when a handler 232 identifies a component 222, according to embodiments of the present disclosure. In particular, the feedback 162 of FIG. 15 which was submitted for the platform component 266, the actions 262 to be taken include submitting a problem report 268 and sending the submitted feedback 162 via an email 270. As shown in FIG. 16, the problem report 268 and the email 270 should be submitted and sent to the platform development team. The page 300 includes a table 302 that members 304 of each team 286, an email address 306 for each member 304, a status 308 for each member 304, and the team 286. The status 308 may indicate whether the team member 304 is enabled. That is, if the status 308 is active, then the team member 304 is notified. If the status 288 is inactive, then the team member 304 is not notified. For the above example, the table 302 lists developer 2 310 as a member of the platform development team 312. As such, the feedback framework may submit and send the problem report 268 and the email 270 to developer 2 310 (e.g., using the corresponding email address 314).

Figure 18:
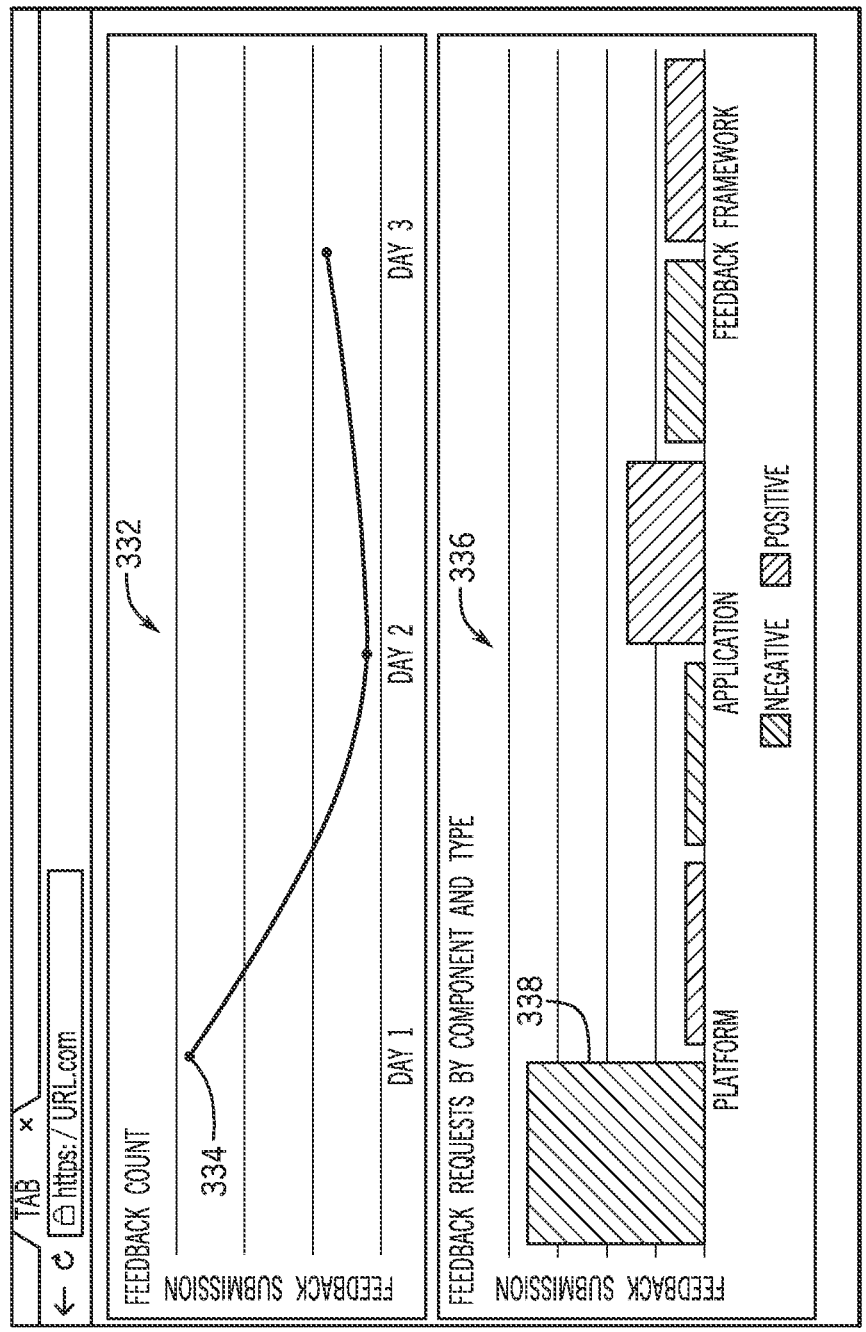
FIG. 18 is an example page of metrics generated by a feedback framework, according to embodiments of the present disclosure.

Because the feedback framework receives feedback from the cloud computing system 10 at the centralized feedback application 54, the feedback framework may analyze the feedback and associated data across the cloud computing system 10, and conveniently generate useful metrics related to the submitted feedback. FIG. 18 is an example page 330 of metrics generated by the feedback framework, according to embodiments of the present disclosure. In particular, a plot 332 illustrates a count of feedback submissions or requests 334 over time. A bar graph 336 illustrates a count of feedback submissions or requests 338 for each component (e.g., the cloud-based platform 20, software application 56, or the feedback framework) and by type (e.g., positive or negative feedback). For example, if the star rating of the feedback (as provided by the feedback input control 122 of FIG. 6) is three stars or higher, the feedback framework may consider the feedback to be positive feedback. Otherwise, the feedback framework may consider the feedback to be negative feedback.

Figure 19:
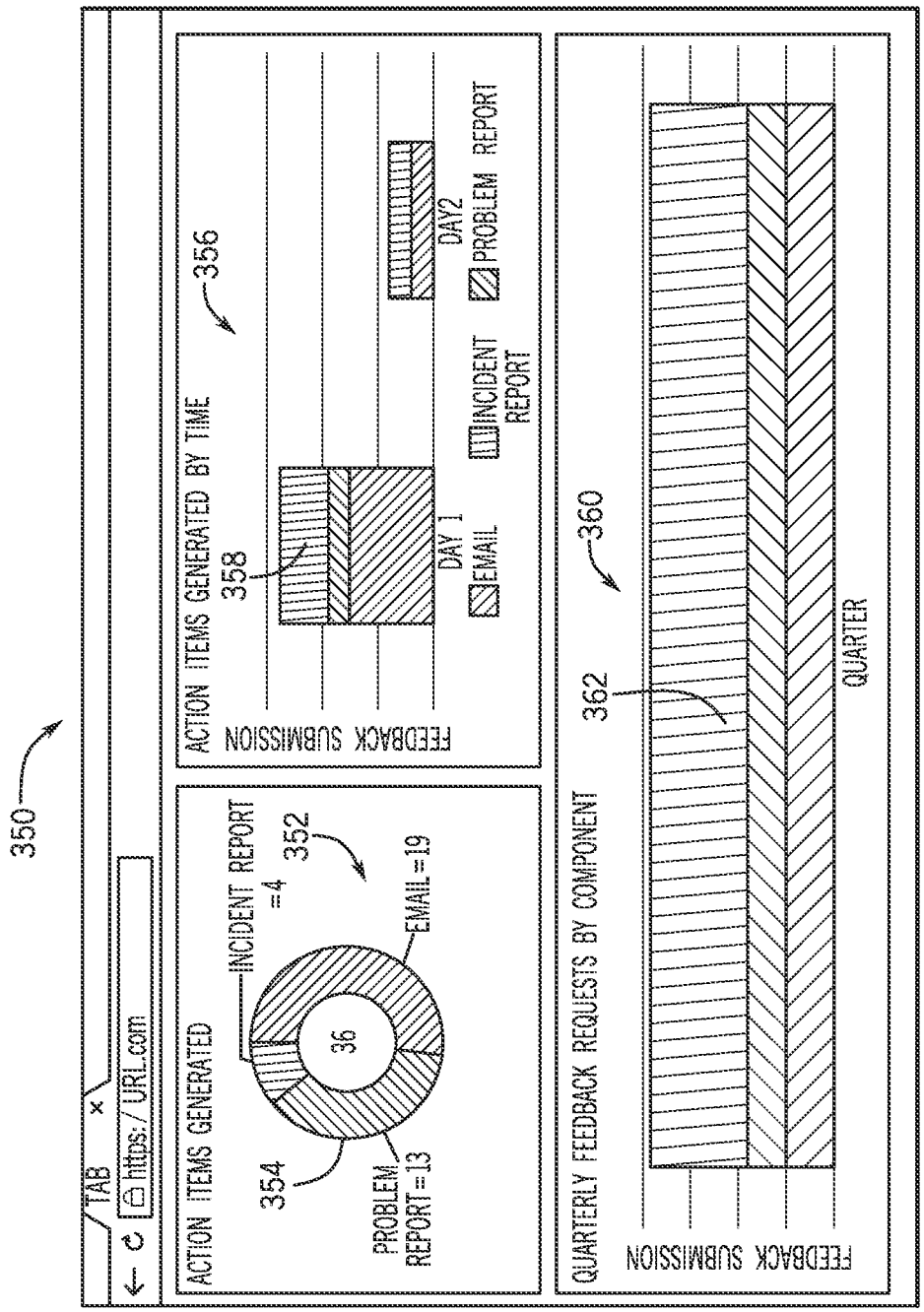
FIG. 19 is another example page of additional metrics generated by a feedback framework, according to embodiments of the present disclosure.

Additionally, FIG. 19 is another example page 350 of additional metrics generated by the feedback framework, according to embodiments of the present disclosure. In particular, a chart 352 illustrates a count of action items 354 generated by type (e.g., emails, problem reports, or incident reports). A first bar graph 356 illustrates a count of actions items 358 over time and by type. The page 350 also includes a second bar graph 360 that illustrates a count of actions items 362 for a quarter by type.

Figure 20:
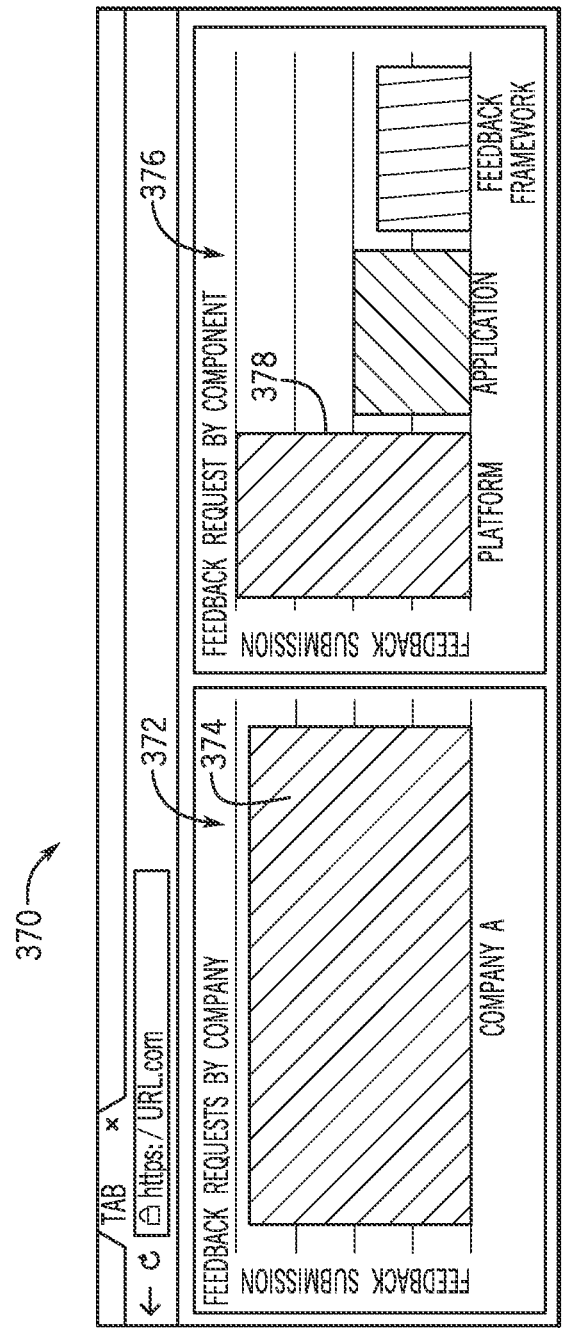
FIG. 20 is another example page of additional metrics generated by a feedback framework, according to embodiments of the present disclosure.

Moreover, FIG. 20 is another example page 370 of additional metrics generated by the feedback framework, according to embodiments of the present disclosure. In particular, a chart 372 illustrates a count of feedback submissions or requests 374 submitted by a company. A bar graph 376 illustrates a count of feedback submissions or requests 378 by type. In this manner, FIGS. 18-20 illustrate useful metrics that may be generated by the feedback framework for the client, a developer, or an information technology specialist to view or analyze.

Figure 21:
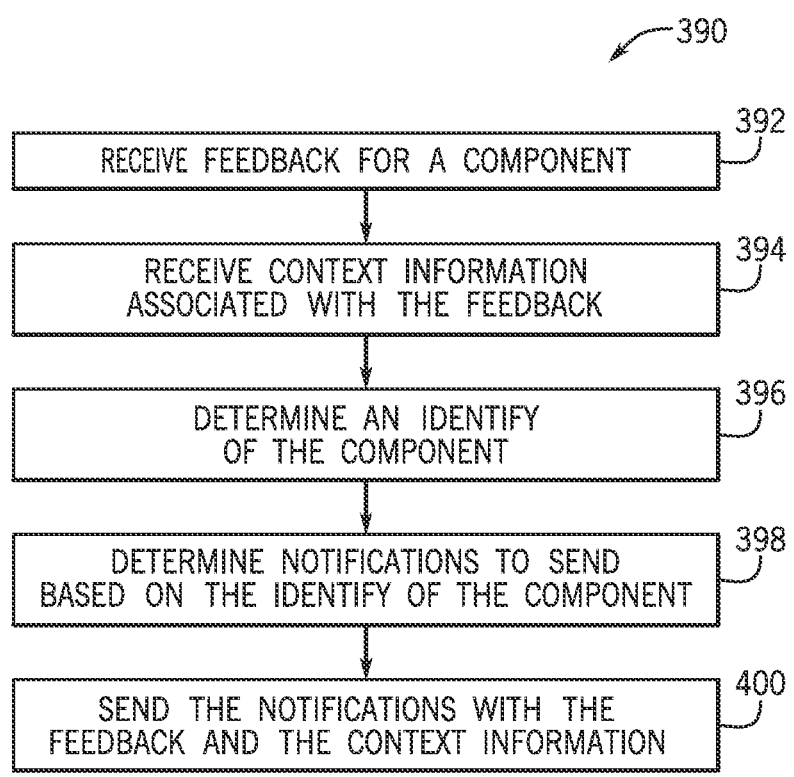
FIG. 21 is a flowchart of a process for providing feedback associated with a cloud computing system, according to embodiments of the present disclosure.

FIG. 21 is a flowchart of a process 390 for providing feedback associated with the cloud computing system 10, according to embodiments of the present disclosure. The process 390 may be implemented in the form of a software application that includes instructions executable by at least one suitable processor of the cloud computing system 10, such as the processor 72. The illustrated process 390 is merely provided as an example, and in other embodiments, certain illustrated steps of the process 390 may be performed in other orders, skipped, or repeated, in accordance with the present disclosure.

As illustrated, in process block 392, the processor 72 receives feedback for a component 222. In particular, the processor 72 may first receive an indication of the feedback when the client selects the feedback control 64 as illustrated in FIG. 5. The processor 72 may then receive the feedback via the feedback input controls 122 and/or 130 as illustrated in FIGS. 6-7, and, as such, the feedback may include a rating and/or text feedback. Additionally, the component 222 may include the feedback framework, the cloud-based platform 20, the software application 56, the web browser 60, the client device 14, the client instance 42, the virtual server 24, the cloud computing system 10, and/or the computing system 70.

In process block 394, the processor 72 receives or determines context information associated with the feedback. In particular, the context information may include a system log and/or a screenshot 136 as provided via the feedback input controls 132 and/or 134 as illustrated in FIG. 7. The context information may also include information that the client does not provide input for, such as a web address or URL 138, version information (e.g., of the software application 56, the web browser 60, the operating system of the client device 14, the cloud-based platform 20, and/or the cloud computing system 10), CPU health information, network health information, prompts or error messages, and/or the like.

In process block 396, the processor 72 receives or determines an identity of the component 222. In particular, the processor 72 may use a handler 232 as illustrated in FIG. 14 to identify the component 222. In some embodiments, the identity of the component may be considered to be part of the context information received or determined in process block 394.

In process block 398, the processor 72 receives or determines one or more notifications to send based on the identity of the component 222. In particular, the component 222 may be associated or linked with one or more types of notifications (e.g., problem reports, emails, or incident reports) and one or more teams or persons for which to send the notifications to. For example, FIG. 16 illustrates components 222 associated or linked with actions 262 and teams 286. When a component 222 identified (e.g., by a handler 232), the feedback framework may take the actions 262 corresponding to the component 222 with respect to the teams 286. FIG. 17 illustrates how team members 304 are associated with each team 286. While the present disclosure discusses sending notifications based on the identity of the component 222, it should be understood that any suitable operation may be performed by the processor 72, such as executing a script (e.g., a set of instructions or computer code that is used to automate one or more processes that would otherwise need to be executed step-by-step by a developer) that resolves or addresses the related feedback. In some embodiments, each action 262 may be associated with a feedback action table which maps or associates the action 262 to a handler, function, script, portion of computer code, or software (e.g., instructions executable by the processor 72 or any other suitable processor) that performs the action 262.

In process block 400, the processor 72 sends the one or more notifications with the feedback and the context information. In particular, the processor 72 performs the actions 262 corresponding to the component 222 with respect to the teams 286. The actions 262, which may include problem reports, emails, or incident reports, may include the feedback (e.g., rating and/or text feedback) as well as the context information (e.g., a web address or URL 138, version information, CPU health information, network health information, prompts or error messages, and/or the like). In this manner, the process 390 may provide sufficient context information associated with the feedback for an information technology specialist or a developer to diagnose and address issues while delivering the feedback and context information quickly and efficiently to the relevant information technology specialist or developer.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An information technology platform, comprising:
a non-transitory memory storing instructions;
one or more hardware processors that, when executing the instructions, are configured to:
implement a client instance accessible by a plurality of client devices, wherein the client instance is enabled by a virtual server and is configured to:
implement a debugging interface that indicates that an error has occurred in a component associated with the information technology platform, wherein the debugging interface comprises a feedback button;
receive an indication of feedback via the feedback button in the debugging interface from a client device of the plurality of client devices, wherein the feedback is associated with the component, and wherein the component is associated with a component type of a plurality of component types;
obtain context information associated with the component based at least in part on the error in the debugging interface, wherein the context information comprises a system log containing the error;
select a handler from a plurality of handlers based at least in part upon the component type, wherein each of the plurality of handlers corresponds to a respective component type;
identify an identity of the component using the selected handler; and
send a notification based on the feedback, the identity of the component, and the context information to resolve or address the error based on the context information.

2. The information technology platform of claim 1, wherein the plurality of handlers comprise one or more default handlers, one or more custom handlers, or any combination thereof.

3. The information technology platform of claim 2, wherein each custom handler of the one or more custom handlers corresponds to a third-party software application or a portion of the third-party software application.

4. The information technology platform of claim 1, wherein the feedback comprises a rating, text, an image, or any combination thereof.

5. The information technology platform of claim 1, wherein the context information comprises a web address or Uniform Resource Locator of a web browser of the client device, version information of a software application of the information technology platform, version information of the web browser, version information of an operating system of the client device, version information of the information technology platform, processor health information of the client device, network health information of the client device, a prompt or error message of the client device, or any combination thereof.

6. The information technology platform of claim 1, wherein the plurality of component types comprises a software application of the information technology platform, a web browser of the client device, the client device, the client instance, a virtual server of the information technology platform, or any combination thereof.

7. The information technology platform of claim 1, wherein the context information is obtained without user input.

8. A method, comprising:
    implementing a client instance in an information technology platform, wherein the client instance supports a plurality of client devices and is enabled by a virtual server;
    implementing a debugging interface that indicates that an error associated with a component of the information technology platform has occurred, wherein the debugging interface comprises a feedback button;
    receiving an indication of feedback via the feedback button in the debugging interface from a client device of the plurality of client devices supported by the client instance, wherein the feedback is associated with the component, and the component is associated with a component type of a plurality of component types;
    obtaining context information associated with the component based at least in part on the error in the debugging interface, wherein the context information comprises an indication of the error;
    selecting a handler from a plurality of handlers based at least in part upon the component type, wherein each of the plurality of handlers corresponds to a respective component type of the plurality of component types;
    identifying an identity of the component using the selected handler; and
    sending a notification to resolve or address the feedback based on the identity of the component, wherein the notification comprises the feedback and the context information.

9. The method of claim 8, comprising implementing a plurality of custom handlers.

10. The method of claim 9, wherein each custom handler of the plurality of custom handlers corresponds to a software application or a portion of the software application.

11. The method of claim 8, wherein the identity of the component is associated with one or more teams, wherein sending the notification comprises sending the notification to the one or more teams associated with the component.

12. The method of claim 8, comprising identifying, via the handler, the component based on a portion of a web address or Uniform Resource Locator, wherein the web address or Uniform Resource Locator is configured to provide access to the component.

13. The method of claim 8, wherein the indication of the error comprises a screenshot containing the error or a system log containing the error.

14. The method of claim 8, wherein the feedback comprises a rating on a rating scale, and wherein the rating corresponding to the feedback is below a threshold for the rating scale.

15. The method of claim 14, comprising receiving a second indication of second feedback where a rating in the second feedback is above a threshold for the rating scale and no context information is obtained for the second feedback.

16. A non-transitory, computer-readable medium having instructions stored thereon that, when executed by one or more hardware processors, cause the one or more hardware processors to perform actions comprising:
    implementing a client instance accessible by a plurality of client devices, wherein the client instance is associated with an information technology platform and is enabled by a virtual server, the client instance configured to:
        implement a debugging interface that indicates that an error has occurred in a component associated with the information technology platform, wherein the debugging interface comprises a feedback control used to indicate that feedback is to be entered in the debugging interface;
        receive an indication of feedback via the feedback control in the debugging interface from a client device of the plurality of client devices, wherein the feedback is associated with the component, and wherein the component is associated with a component type of a plurality of component types;
        obtain context information associated with the component based at least in part on the error, wherein the context information comprises a system log containing the error;
        select a handler from a plurality of handlers based at least in part upon the component type, wherein each of the plurality of handlers corresponds to a respective component type of the plurality of component types;
        identify an identity of the component using the selected handler; and
        send a notification to resolve or address the feedback to a target identified based on the identity of the component, wherein the notification comprises the feedback and the context information.

17. The non-transitory, computer-readable medium of claim 16, wherein each component is associated with a first-party developer or a third-party developer.

18. The non-transitory, computer-readable medium of claim 17, wherein the feedback control comprises a button, a dial, a dropdown menu, a form, a text field, a text box, or any combination thereof.

19. The non-transitory, computer-readable medium of claim 16, wherein the target comprises one or more teams associated with the identity of the component.

20. The non-transitory, computer-readable medium of claim 16, wherein the sending the notification comprises submitting a problem report, an incident report, an email, or any combination thereof.

* * * * *